Figure 24:
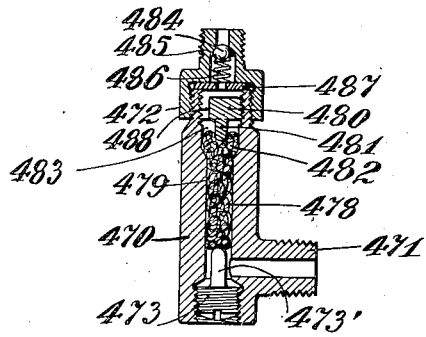

Oct. 9, 1934.  J. BIJUR  1,975,920
LUBRICATION METHOD AND INSTALLATION AND THE ELEMENTS THEREOF
Filed Aug. 9, 1922  6 Sheets-Sheet 1
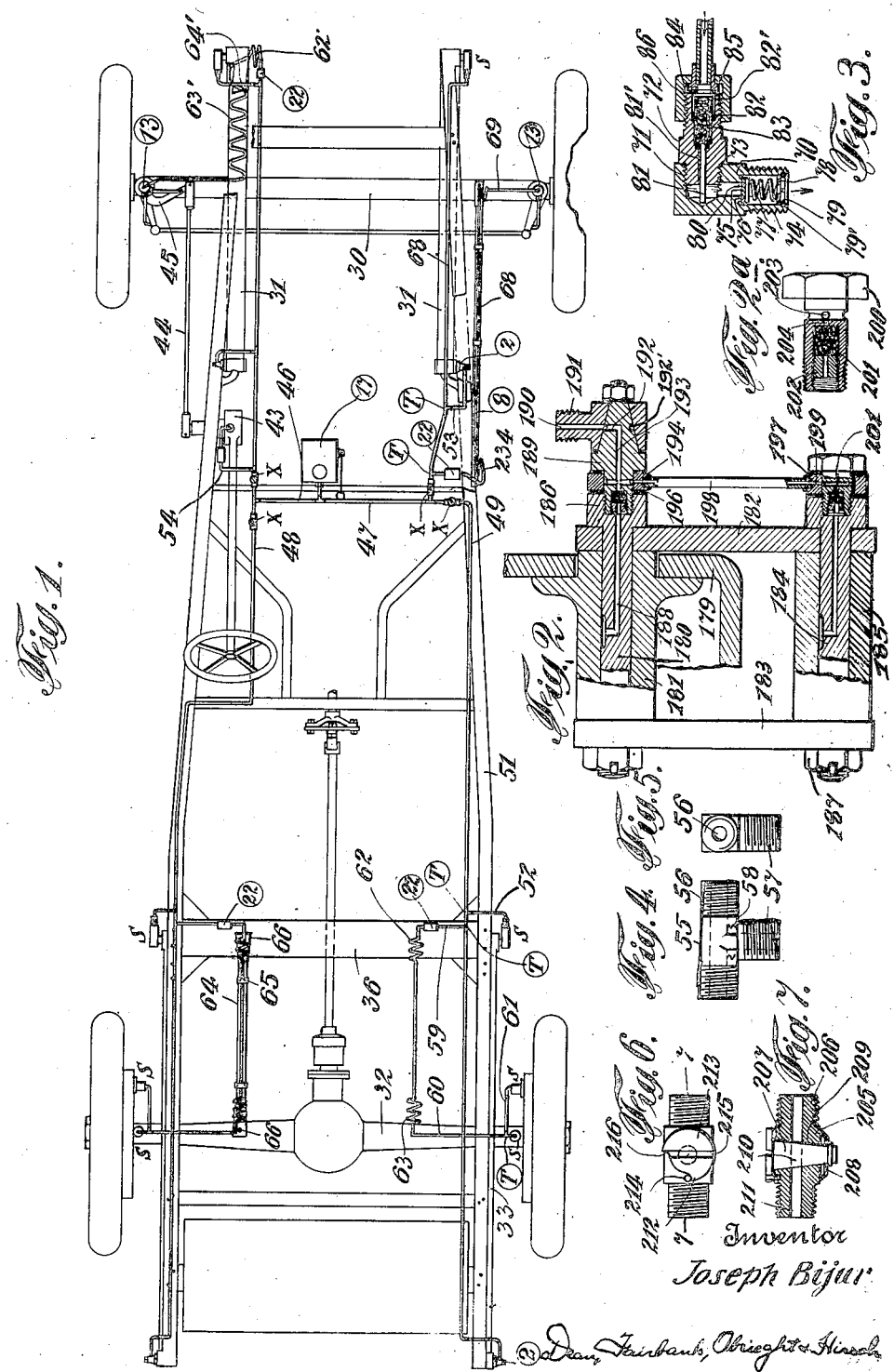
Inventor
Joseph Bijur

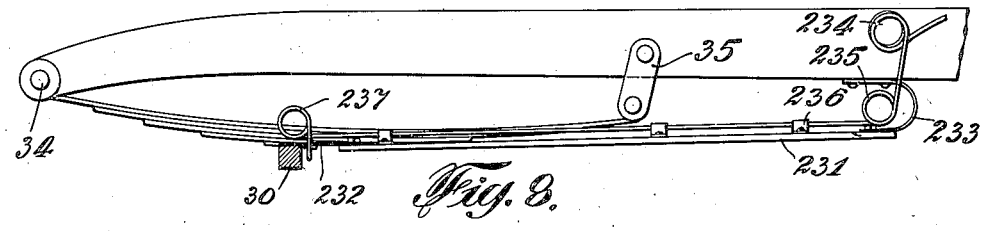
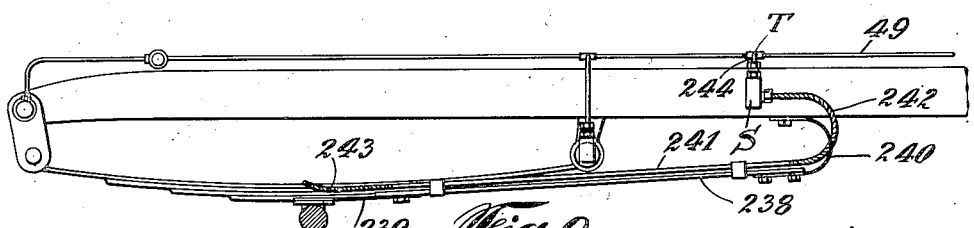
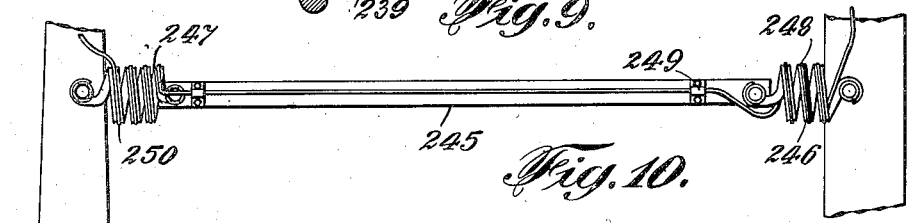
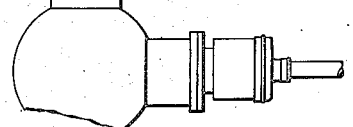
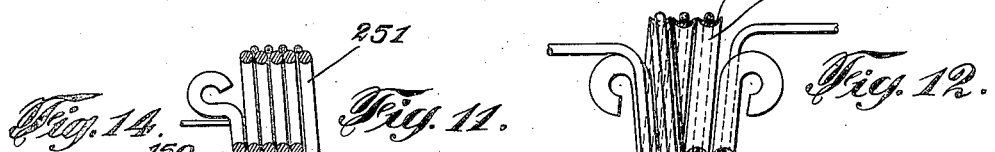
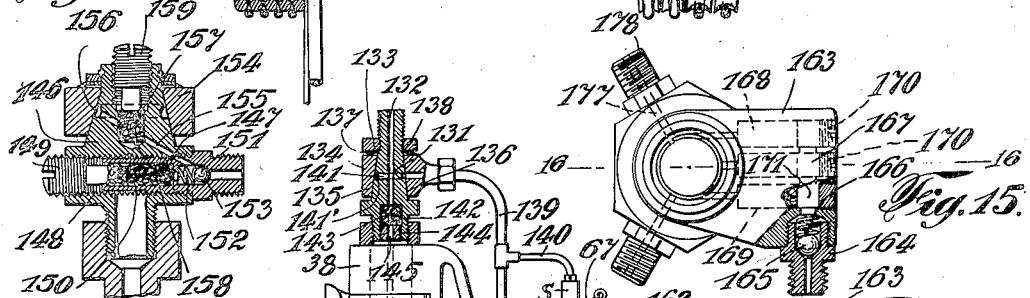
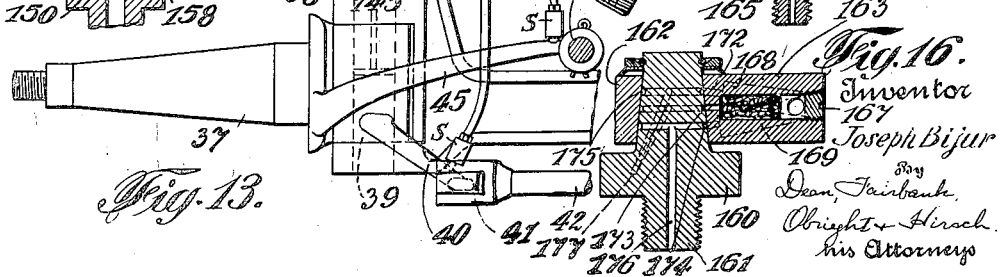

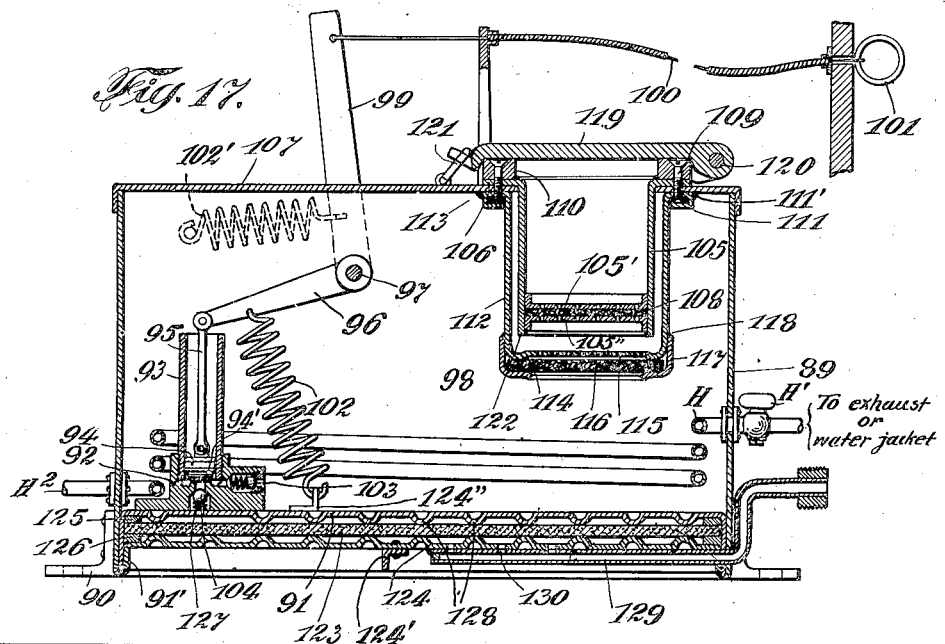
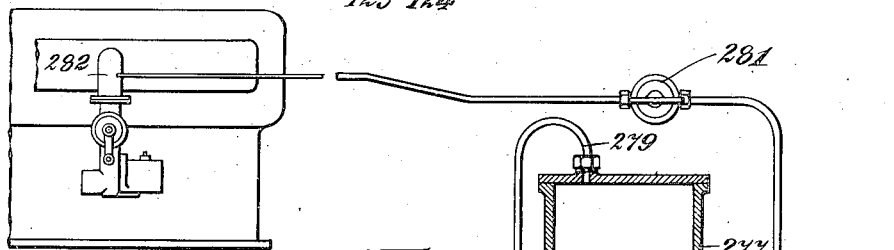
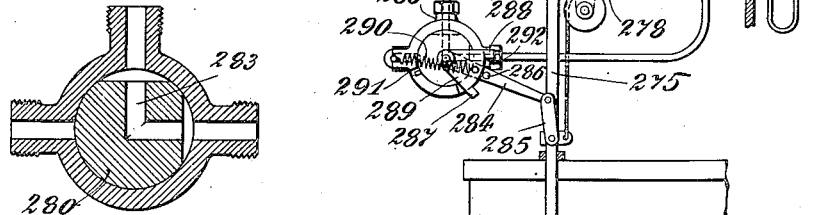
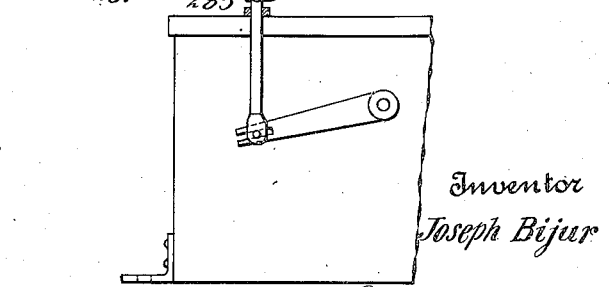

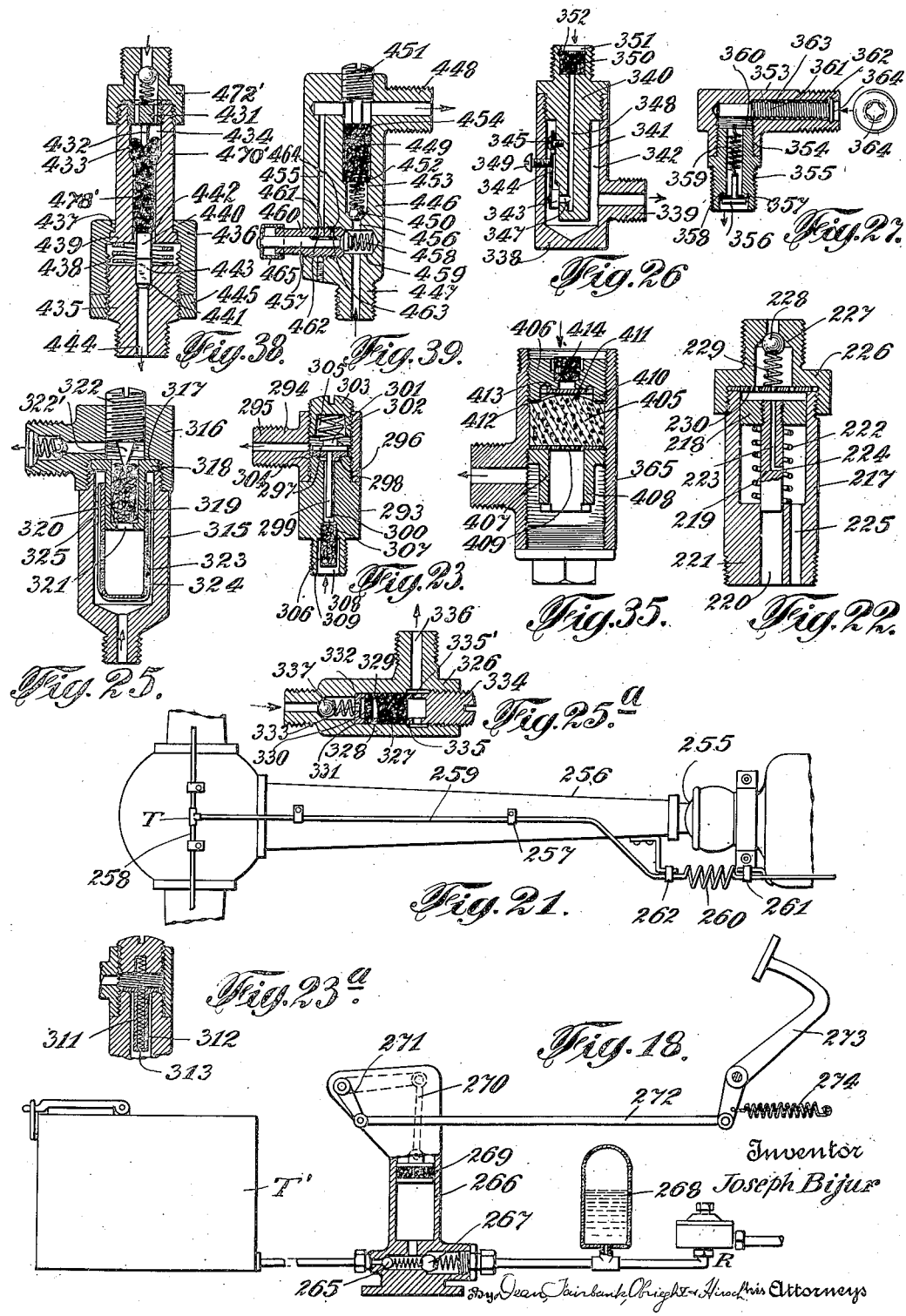

Oct. 9, 1934.  J. BIJUR  1,975,920
LUBRICATION METHOD AND INSTALLATION AND THE ELEMENTS THEREOF
Filed Aug. 9, 1922  6 Sheets-Sheet 6

Inventor
Joseph Bijur
By Dean, Fairbanks, Brights & Hirsch
his Attorneys

Patented Oct. 9, 1934

1,975,920

UNITED STATES PATENT OFFICE

1,975,920

LUBRICATION METHOD AND INSTALLATION AND THE ELEMENTS THEREOF

Joseph Bijur, New York, N. Y., assignor, by mesne assignments, to Auto Research Corporation, a corporation of Delaware Application August 9, 1922, Serial No. 580,668

65 Claims. (Cl. 184—7)

My present invention relates to remote-control lubrication and is concerned primarily with systems, methods, installations and the constituent elements thereof for lubricating one or more bearings on a machine or group of machines from a readily accessible point of control. The invention has its preferred application to the lubrication of all or most of the bearings on the chassis of a vehicle such as an automobile or a motor truck.

An object of the invention is to provide a simple and reliable installation upon a machine, more particularly a motor vehicle, operable substantially without effort or attention for satisfactorily lubricating all or a substantial number of the bearings thereof from a central station thereon.

It will be apparent that the bridging conduit through which lubricant is delivered from the station preferably on the frame to a bearing on an axle of a vehicle should permit of the relative movement of said parts in operation without rupture of or leakage from said conduit and without leaks from wearing swivel joints. My invention has among its objects to provide serviceable piping of short length, small diameter and low cost, easy to install, oil-tight, though not necessarily air-tight, under all conditions of operation, the bridging portion or portions of which have the required yield or flexibility, where flexure should occur, yet are not subject to whipping and are substantially proof against rupture or leak from vibration of the moving vehicle even when subjected to rough usage.

Another object is to provide a lubricating installation, the use of which shall not require the exercise of any selective discretion or even the performance of an operational sequence, but in which as the result of the simplest of manipulations, correct and sufficient lubrication is effected at each of the bearings, whether tight or loose and without excessive overflow.

Another object is to provide an installation of the type referred to in which the performance of a succession or series rather than a single, of the operating manipulations last referred to, will not result in any corresponding excess of flow to the bearing, thus avoiding the copious loss of oil otherwise resulting from operation by an impetuous person.

Another object is to provide an installation of the character referred to in which increase in viscosity of the oil does not entail a corresponding increase of manual effort.

Another object is to provide a system of the above type embodying small bore piping and readily adjustable to effect distribution of a charge of lubricant to the bearings, whether tight or loose, in any desired proportions.

Another object is to provide an installation of the type referred to in which the troublesome operation of cleaning fittings and the like, to maintain the system in operation, is eliminated.

In the preferred method and apparatus for carrying out the above and other objects, the lubricating oil is forced through small metal pipes to the bearings in parallel by pressure applied at one point of control. In the path of flow to each bearing and in the vicinity thereof, there is interposed a pressure-absorbing resistance, which I call a seepage resistance or obstruction, preferably associated or combined with a valve, spring-pressed tightly against its seat to maintain the line full at all times. The seepage resistance offers an obstruction to the flow of liquid greater than the frictional resistance encountered in the bearings or in the length of the pipes, so that it is a determining factor in the flow to each bearing, substantially regardless of the tightness or looseness of the bearings or of the length or resistance of the line.

A desirable type of seepage resistance, preferred in many applications, is of metal or other non-porous material, affording one or more minute crevices for the passage of the oil from the line. A satisfactory form of this type comprises a small bore tube, plugged with a rod, disk or cup, a few thousandths of an inch smaller in diameter, providing a minute crevice, cylindrical in cross-section, through which the oil passes slowly to the bearing when sufficient pressure is applied. In a desirable embodiment a pressure operated valve with or without a rigid coaxial extension, extending either toward or from the valve seat, constitutes the plug element affording the minute cylindrical crevice. In another desirable embodiment, the plug element is distinct from the valve. In another suitable type of seepage resistance, the oil is forced through a plug of closely packed porous material, such as felt or steel wool.

The seepage resistance or obstruction and the associated valve are preferably located in the interior of a pipe fitting, which I call a seepage fitting. A preferred seepage fitting of general application is in the form of an elbow to be screwed in lieu of an oil cup into a part to be lubricated. Where the part, such as a spring bolt extends at right angles to the chassis frame, the elbow fitting would not ordinarily project far from the side of the frame, and accordingly, would not be liable to be broken off.

If an initial pressure is applied to the lubricant in the line, substantially in excess of that required to open any of the pressure operated valves, all of said valves, regardless of irregularities encountered in practice, will open substantially concurrently, and oil will then be fed slowly to all bearings at a rate determined largely by the seepage resistances, through which it is forced on its way to the bearing, by the applied pressure.

In the preferred embodiment, the desired substantial initial pressure is exerted upon the lubricant by the spring returned piston of a pump, first charged either by a manual or a manually-controlled operation, or automatically, the resistance of the seepage obstructions in the line serving to greatly retard the otherwise rapidly executed operative pump stroke for feed of the oil, drop by drop, at each bearing at a rate preferably in the order of a few drops per minute.

Where, as in the present case, the lubricant passes through obstructions near the delivery ends of the line, affording but minute outlets, it will be seen that in the course of time, the accumulation at or in the obstruction of fine particles of dirt carried with the oil may clog the seepage resistance or other obstruction, and interfere with or entirely arrest the flow of oil therethrough. Moreover, in any system embodying relief valves, with or without my seepage resistance, the lodging at a relief valve seat, of a small particle of dirt carried with the oil, for instance, may prevent the relief valve from seating properly so that oil will leak from the line even when no pressure is applied.

I have, accordingly provided special means for intercepting such impurities before they can reach the obstruction or the valve. In the preferred embodiment, this means includes a fine filter associated with the pump. In the system involving the seepage obstructions of high resistance, referred to, where the flow of lubricant from the pump is extremely slow, it is feasible and desirable to provide adjacent the pump and preferably as a part of the pump reservoir structure, a filter of substantial area through which the charge of lubricant in the cylinder is forced to the pipe line on its way to the bearings. The seepage fitting is preferably provided with further filter means to intercept any dirt or chips picked up in the pipe line.

To guard against supplying dirty oil to the pump reservoir, which might rapidly clog the fine filter, the intake opening end of said reservoir is provided with a strainer cup that arrests any solid particles from the oil as it is poured in. To prevent the entry of dust or dirt into the reservoir while the strainer cup is removed from the reservoir for cleaning, I preferably provide a filter cup permanently secured as by soldering about the inlet opening in the reservoir, said latter cup serving, moreover, to remove solid particles from the oil finer than those intercepted by the strainer cup.

The pump is mounted at a convenient place on the chassis frame, and the main conduits extend along the sides of the frame and have taps each provided with a seepage fitting from which the various parts carried on the frame, such as the spring shackles and the steering gear are supplied in parallel with lubricant, said piping having, moreover, one or more yielding branches or taps also provided with seepage fittings and extending to the bearings on the unsprung part or axles, for instance, to the king pin, the tie rod clevises and the brake linkage, and to other parts movable with respect to the frame.

Because of the high resistance of the seepage obstructions, the rate of flow through the mains is very slow, hence pipes of extraordinarily small bore may be used to convey the oil, without objectionable loss of head. Such piping is inexpensive and can easily be formed to follow around obstructions on the frame and to provide the flexibility for the yielding branches by coiling preferably into a helix, where angular or longitudinal motion is desired. The pipe being light has low inertia compared to its strength and may bridge unsupported through the air for several feet from the frame to an unsprung part of the chassis without whipping. If desired, however, the length of the conduit may be anchored to structural parts of the vehicle, or along separate light but rigid members between the frame of the chassis and the axles, which move relative thereto, leaving only the short bridging portions unsupported between their ends. Thus, I provide a continuous integral oil-tight solid metal duct from the frame to the axles, eliminating the likelihood of leakage incurred in a conduit of so-called flexible hose, or in movable joints under pressure.

The lubricant thus passes from the pump on the frame to a bearing on an axle through a seepage resistance adjacent said bearing, the pressure being transmitted without leak through the solid oil-tight pipe including the helical flexible bridging portion or portions. In an alternative embodiment, flexible tubing may be substituted for the helically formed solid pipe bridging connections, but it is desirable in that case to place the pressure absorbing plug or seepage resistance in advance of the flexible tubing, so as to avoid putting the flexible hose under pressure with consequent risk of leakage.

By reason of the extremely slow rate of flow of the lubricant through the mains, the drop of pressure therein is substantially negligible, so that substantially the same oil pressure will be applied to seepage fittings remote from the pump as to those nearest thereto. It is, therefore, feasible to set the seepage fittings permanently and non-adjustably for a definite rate of flow. If desired, however, adjustable seepage fittings may be provided, in which the resistance can be varied at will from the exterior, to adjust the rate of flow through any fitting, substantially independently of the rate of feed through the companion fittings.

Should a break occur in the pipe line, while the pump is under pressure, the back pressure in the broken line would be relieved, causing the pump to rapidly execute its stroke, to force the oil under pressure through the leak. To maintain the rest of the installation in service pending repair of the broken line, I provide screw-driver operated stop cocks in the mains adjacent the headers by which communication between the pump and the ruptured line can be shut off.

It is also desirable to provide automatic safety valves particularly in advance of the flexible portions of the line, functioning upon release of counter-pressure following the rupture of the line therebeyond, to automatically close the pipe and prevent emptying of the charged pump through the leak.

As the viscosity of lubricating oil increases rapidly as its temperature is lowered, particularly in the range below the freezing point of water, I may employ a thinner lubricant in the winter, or provide special means to expedite lubrication in cold weather, with a grade of oil suitable in summer. This, I accomplish by heating the oil within the reservoir in winter as through a tap from the exhaust or from the water jacket, or by locating the reservoir in a region warmed directly or indirectly by the engine, or by applying additional spring tension to the pump to exert increased pressure upon the lubricant, or by two or more of these methods combined. Moreover, the seepage fittings may be constructed, if desired, to respond automatically to enlarge the crevice through which the oil is forced, in order to reduce the opposition to flow sufficiently to compensate for the greater viscosity of the oil in winter.

Where a continuous lubrication is desired, without need for any special manual operations, the lubricant pump may be energized automatically in the usual operation of the machine or of a control element thereof. In one preferred embodiment, a small oil pump is connected with a brake pedal or other lever frequently actuated in normal operation to supply its charge to a pressure bottle from which the oil is, in turn, delivered to the bearings, a high pressure relief valve at the delivery side of the pressure bottle assuring the application at all times of a sufficiently high pressure to the line. In another desirable embodiment, the pump after it has been discharged to a predetermined extent, is automatically connected to an operative part of the engine, for instance, for application of the suction in the intake manifold, which supplies the force to recharge it and is then automatically disconnected from the pump to allow the latter to slowly feed the lubricant to the bearings.

Figure 36:
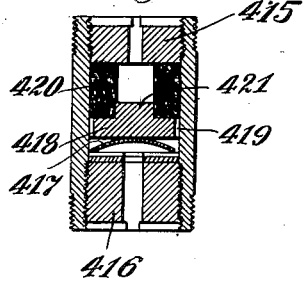
Figure 37:
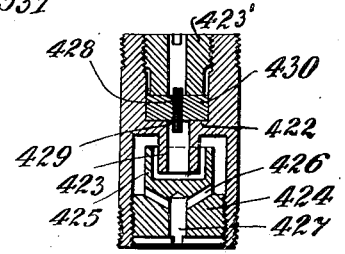

In the accompanying drawings in which are shown some of the various possible embodiments of the several features of this invention, Fig. 1 is a diagrammatic plan view of a lubricating installation upon a motor vehicle indicating the positions and relations of the various constituent elements, Fig. 2 is a view on a larger scale of a spring shackle element, Fig. 2a is a detail view of a seepage plug constituting an element of Fig. 2, Fig. 3 is a view in longitudinal section on an enlarged scale of a preferred form of seepage fitting, the location of which is indicated at S in Fig. 1 and in the detail views, Fig. 4 is a side elevation of a preferred T fitting, Fig. 5 is an end elevation thereof, Fig. 6 is a top view of an emergency stop valve, Fig. 7 is a sectional view taken along the line 7—7 of Fig. 6, Fig. 8 is a side view on a larger scale of a desirable form of conduit connection to an axle, Fig. 9 is a modified form of conduit connection to an axle, Fig. 10 is a modified form of conduit connection to a rear axle, Figs. 11 and 12 are detail views of conduit helix mounts, Fig. 13 is a view partly in section of a device for lubricating a king pin stationary relative to the axle and associated parts, Fig. 14 is a fragmentary view in longitudinal cross-section of a modification, Fig. 15 is a plan view of a swivel for a king pin movable relative to the axle, Fig. 16 is a sectional view taken along the line 16—16 of Fig. 15, Fig. 17 is a view in longitudinal cross-section of a preferred form of reservoir and pump, Fig. 18 is a diagrammatic view of an alternative form of oil pressure applying means, Fig. 19 is a diagrammatic view partly in section of a modified form of pump and actuating means therefor, Fig. 20 is a sectional view at right angles to the axis of the automatic valve of Fig. 19, Fig. 21 is a fragmentary view of a modified form of conduit connection to a rear axle, especially suitable for a vehicle having a torque tube, Fig. 22 is a view in longitudinal cross-section of a rapid flow valve, Figs. 23, 23a, 24, 25, 25a and 26 to 35 inclusive are alternative forms of elbow seepage fittings, Figs. 36, 37 and 38 are alternative forms of straight pipe seepage fittings, Fig. 39 is a preferred form of by-pass seepage fitting, and;

Figs. 40 to 45 inclusive are further forms of seepage elements.

Referring now to the drawings, in Fig. 1 is shown a plan view of a conventional form of automobile chassis including a front axle 30, front springs 31 lashed thereto, a rear axle 32 and rear springs 33 lashed thereto. The chassis frame is carried upon the springs, each spring being connected thereto in general by a bolt 34 at one end and a shackle 35 at the other end (best indicated in Fig. 8). The sides of the frame are connected by the usual cross bars 36. Each front wheel (see Fig. 13) is journaled upon a steering knuckle 37 pivotally connected to the forked end 38 of the front axle by a king pin 39. Integral with the steering knuckle 37 is the so-called third arm 40 pivotally connected to the clevis 41 of the tie rod 42. The steering gear 43 (see Fig. 1) is connected by means of drag link 44 with the usual steering arm 45 also formed integral with one of the steering knuckles 37. The rear wheels have the usual brake bands provided with the usual clamping links (not shown).

By my invention, I accomplish lubrication with a minimum of effort from one control station conveniently accessible on the vehicle of all of the bearings upon the chassis whether on the unsprung axles or on the sprung chassis frame. In particular, oil from the central source lubricates the king pins, the tie rod clevises, the steering gear, the spring shackle bolts on all of the springs and the brake linkage.

Before proceeding to the detailed description, it may be briefly noted that in the preferred embodiment, the entire length of the conduit is of small solid-metal pipe, that is, of pipe devoid of seams and of internal diameter preferably in the neighborhood of one eighth inch, so that said pipes including the bridging portions thereof that may extend unsupported between their ends from the frame to the unsprung carrying elements are oiltight, said portions being, of course, of sufficient length to flex with the relative movements of axles and frame, without undue strain thereon. Each pipe is provided adjacent the bearing, which it supplies, with a high resistance obstruction member, the location of which is indicated in Fig. 1 by the letter S. The obstruction members, designated "seepage fittings" hereinafter serve as closures to prevent egress of oil from the full solid pipe lines, but when the lubricant is placed under sufficient pressure, it is forced slowly past said obstructions to the bearings.

A preferred lubricating circuit is indicated in Fig. 1 and will first be described, then will follow a detailed description of the various constituent elements that constitute a preferred practical installation.

*The general layout—Fig. 1*

In front of the dashboard is mounted a pressure pump, 17 shown in detail in Fig. 17, which may be hand-operated and which is connected by transverse headers 46 and 47 to left and right mains 48 and 49 respectively extending the length of the frame, preferably within the channel frames, though shown above and to the side thereof to better reveal the connections. The main pipes may have offsets (not shown) to pass around the various projections on the frame and to yield without undue strain thereon as the frame flexes in operation of the vehicle. The various bearings are supplied from the mains, as will appear below, the construction and arrangement being preferably identical at the right and the left, except, of course, for the steering gear which is located at only one side of the vehicle. Referring now to the right side of the vehicle of Fig. 1, the main pipe is preferably secured by stapling at various parts along the length thereof to the channel frame 51, so that no whipping or chafing can take place and is connected at the rear and front ends thereof to lubricate the rear spring shackle of the rear spring and the forward spring bolt of the front spring, by constructions shown respectively in detail in Figs. 2 and 3, the location of which is indicated in Fig. 1 by numeral 2 and letter S respectively. A T joint T indicated in detail in Figs. 4 and 5, the specific construction of which will be described below, connects a short tap 52 to the main through which the forward bolt of the rear spring is lubricated and a similar T joint connects a tap 53 to the spring shackle at the rear end of the front spring. A similar tap 54 is similarly connected to the steering gear 43 at the left side.

The T joint preferably comprises the simple pipe fitting shown in Figs. 4 and 5 including a short piece 55 of square rod bored out and threaded at its ends 56 for connection to pipe sections. A nipple 57 is threaded transversely into one of th square sides of piece 55, with its shoulder 58 abutting thereagainst.

The bearings on the unsprung parts, that is, on the front or rear axle, which move with said axles relative to the frame in the operation of the vehicle, are supplied from the mains 48 and 49 through flexible connections or conduits.

The conduit 59 to the rear axle is connected as by one of the T joints T to the main 49 adjacent cross bar 36 and extends transversely thereof for a short distance and then longitudinally of the vehicle to the rear axle 32 and has an integral transverse portion 60 connected through a seepage fitting S to one of the brake links (not shown), a branch 61 connected thereto by another one of the T joints T, establishing communication through a further seepage fitting S to the other brake link (not shown). The entire length of the conduit 59 is preferably formed of an integral length of small bore piping, formed with a few helical turns 62 adjacent the forward end, and similar helical turns 63 at the rear end of the longitudinally extending portion thereof. It will be seen that the helical turns constitute hinging portions which will readily flex within the required limits with relative movement of the rear axle and the frame in operation of the vehicle. The conduit 59 being of a continuous solid metal pipe, will not develop leaks such as are likely to occur where the flexibility inheres in composite conduit sections of the type embodying joints or seams in the length thereof, or of material which deteriorates under the influence of oil. The length of pipe 59 being of small mass has low inertia and high strength and may not whip or lash even if it extends freely from cross bar 36 to the rear axle, as shown at the right of Fig. 1. If desired, however, a special supporting runner 64 may be employed as shown at the left of Fig. 1, for sustaining the length of the conduit 59 stapled thereto as at 65 and in turn, supported by springs 66 from the cross bar 36 and the rear axle 32.

For lubricating the king pin 39, tie rod clevis 41 and steering arm joint 67, shown in detail in Fig. 13 and indicated at 13, at the left of Fig. 1, and without the steering arm joint at 13' at the right of Fig. 1, I employ a conduit 68, tapped at T from the main 49, and constructed and arranged to provide the requisite flexibility, as shown in Fig. 8 to be described below. As will be seen in Fig. 1, the conduit extends forward along the vehicle, and is bent at the front axle as at 69 and extends therealong to supply the king pin and related parts through seepage fittings S by the construction best shown in detail in Fig. 13 described below.

Fig. 8 shows a solid pipe line passing from the frame to the movable front axle. Mounted between the frame and the front axle is a light rigid runner member such as a light beam of wood 231 connected to the front axle by a leaf spring 232, preferably of triangular shape to have equalized bending stress throughout its length. At the end connected to the frame is another similar flat spring 233 looped to connect the rigid member to the frame and permit longitudinal as well as angular motion with respect thereto. The solid pipe coming from the frame is wound into two helices 234 and 235, as shown, and then runs the length of the rigid piece 231 to which it is attached by staples 236, then coils into another helix 237, then extends laterally along the axle to the king pin and is clipped to the axle. By this construction, whipping and damage to the pipe is prevented, while tightness is insured by the use of solid pipe and freedom from breakage is cared for, by obviating undue flexure at any point in its length.

*The obstruction or seepage resistance members S*

Proceeding now to elements of the system and commencing with the obstruction members, the location of which is shown at S in Fig. 1, a desirable form of the same is indicated in Fig. 3. This element comprises a pipe fitting enclosing an obstruction, offering high resistance to flow under pressure and defined by me as "seepage resistance".

The term "seepage resistance" is intended to embrace broadly any obstruction in the line of flow operating to permit only slow, preferably drop by drop, passage of the fluid therebeyond when pressure is applied thereto. The obstructing body may be made entirely of metal or other rigid material, affording one or more minute passages resisting flow to absorb the pressure in the lubricant or tightly packed fibrous or other porous material. Only one preferred form of seepage element, that shown in Fig. 3 will here be described and a number of alternative forms will be described later.

The element shown in Fig. 3 comprises an elbow-shaped fitting, which may be formed of a support element 70 provided with a transverse, tapped socket 71 into which is threaded an inlet cartridge 72 extending at right angles to the support. The support is formed preferably of square stock, so that shoulder 73 on the cartridge 72 will contact snugly with one of the flat sides. The support is threaded at its end 74 for insertion into a bearing, bolt or other part to be lubricated.

A valve 75 is disposed within the support 70 and is urged tight against an annular seat 76, preferably of diameter no greater than 1/8", by a coil spring 77 reacting against a polygonal washer 78 maintained in place within the bore of the fitting support, by a split ring 79 in a groove 79'. The valve is provided with a seating portion 80 of a material, which should be yielding to compensate for irregularities in the seat, smooth to seat completely under light pressure, substantially impervious and chemically inert to oil and non-sticking. Among the materials that answer these requirements are horsehide, smooth finished shark skin, smooth cork, a rubber compound vulcanized to withstand oil, one satisfactory commercial form of which is known as "Hippohide", or varnished cambric mounted on a yielding backing of felt, fibre board or the like, and preferably provided with a seating surface of tin foil to prevent the possibility of sticking at the valve seat.

In general, valves of apparently identical construction will not respond alike, by reason of the fact that springs 77 cannot easily be made of uniform strength.

If, therefore, valves of the form thus far described are located at the various points on a line filled with oil, then upon the application of pressure to the oil in the line, some one relief valve may open sooner or farther than its companions, and relieve the pressure to deliver more than its proportion of oil, a condition which would be aggravated if such valve were associated with a loose bearing. Some or all of the remaining valves would, therefore, receive insufficient pressure to open effectively, if at all.

To assure reliable lubrication, I provide the fitting with means, offering a substantial resistance to the flow of oil, even after the relief valve has opened, such resistance, therefore, substantially controlling the rate of flow to each bearing, whether tight or loose, regardless of the differences in relief valve spring resistance.

One of various possible constructions, for effecting the desired high resistance, controlling the flow, is shown in Fig. 3 and comprises a length of metal wire 81 within the axial bore 81' in the inlet cartridge 72. The bore 81' is preferably about 1/16" in diameter and about 1/2" long and the wire plug 81 in the neighborhood of .002" smaller in diameter, leaving a minute restricted annular crevice or passage about the wire affording a permanent high resistance to flow.

The cross-sectional area of the annular crevice, though minute, can be made uniform within very fine limits since it is the differential between the cross-section of a bore and a wire plug both of appreciable dimensions and both of which can be easily formed accurately. Greater difficulty would be encountered in forming accurately a minute aperture to provide the necessary resistance to flow, and such aperture would, moreover, be more easily clogged by a minute solid particle, than the preferred annular crevice.

The outer end of the inlet cartridge preferably has a socket 82 within which is fitted a felt filter plug 83, the inner end of which fits snugly therein, while the outer end is preferably loose or spaced from the wall of the corresponding socket portion 82' of somewhat enlarged diameter, as shown.

The end of the pipe line is connected to the seepage fitting by a flange collar 84, soldered thereto and clamped against the end of fitting 72 by a screw cap 85 threaded thereon, an interposed gasket 86 effecting a fluid tight connection.

It being understood that seepage fittings of the character described are located at each of the places indicated by the letter S on the drawings, and assuming that a uniform pressure is concurrently applied at each of the seepage fittings S on the line of magnitude materially greater than that required to open the relief valves 75, it will be apparent that these valves will open substantially at the outset and thereafter the oil will flow through the filter plugs 83, where any small chips or dirt are separated and then through the minute restrictions 81—81' past the valves 75 to the bearings. The high resistance to flow in the restricted passage through the seepage fitting permits the oil to ooze only slowly, drop by drop to the bearing, upon application of a substantial working pressure to the oil.

The high seepage resistance thus serves as a balance element to absorb pressure otherwise relieved by the opening of the relief valve, thereby assuring substantially uniform delivery of oil to the bearings.

The seepage fittings described may be initially set for a fixed resistance but thereafter non-adjustable. It will be understood, however, that the fittings may be initially set for different resistances, or may be arranged to be adjusted in use as by providing for varying the effective length of wire plug in the fitting bore.

To prevent the possibility of rapidly clogging, the obstruction end of the high resistance seepage obstruction which might occur if oil with solid particles of dirt or other solid impurities were supplied thereto, it is desirable to associate with the pump, an efficient filtering means preferably as a part of the pump construction, to assure filtering out the minutest solid particles before the oil reaches the seepage fittings, relying on the filtering end of the latter to intercept any minute particles of dirt, chips or scale from the pipe line.

*The pump*

The pump unit (Fig. 17) comprises preferably a sheet metal box or reservoir 89 having lugs 90 by which it can be secured in any desired place upon the vehicle, preferably in front of the dashboard. The bottom 91 of the box may be raised as indicated and formed integral with the sides from a single blank of sheet metal reversely bent to form a supporting flange 91'. Upon the bottom 91 is secured the pump which comprises a base casting 92 within the upper end of which is threaded an open-ended cylinder 93. The piston 94 is joined by a connecting rod 95 to a lever 96 mounted upon a rock shaft 97 extending through the side wall 98 of the casing, preferably at an elevation higher than that of the lubricant within the reservoir to dispense with the need for packing, an operating lever 99 being mounted upon the projecting end of the rock shaft 97 and connected preferably by a wire 100 to a ring 101 or other operated member on the dashboard of the vehicle. A coil spring 102 connects the lever 96 to a metal angle strip 124'' extending across the bottom 91, thereby normally maintaining the piston at the bottom of its stroke, with its lower leather covered end 94' sealing the outlet, and the operating ring 101 against the dashboard. Preferably the spring 102 is mounted at such inclination, that when the piston is at the bottom of its stroke (as shown) the length of said spring extends at right angles to the length of lever 96, so that the leverage of the spring increases from a minimum, when the piston is at the upper end of the stroke, to a maximum as it reaches the lower end. Thus, the decrease in the tensile force of the spring as it contracts in drawing the piston downward is substantially compensated for by the increase of effective lever arm about rock shaft 97, so that the piston will exert throughout the length of its stroke, a substantially constant pressure upon the oil therebelow. The pump base has a spring pressed ball check valve 103 in the side, past which the oil is sucked by the raising of the piston and a similar spring-pressed relief valve 104 opens upon the downward stroke of the piston for ejection of the lubricant therethrough.

As pointed out heretofore, the seepage fittings may clog after a relatively short period of use, by the interception thereby of minute particles of dirt in the oil.

I, accordingly, employ, preferably embodied in the construction of the pump, a relatively dense filter preferably of sole or similar heavy leather, which will intercept even minute particles of dirt, and thereby pass exceptionally clean oil to the pipe line. The dense filter is preferably interposed in the path of oil flow between the pump and the pipe line and offers such high resistance to flow, that the oil is urged therethrough at an extremely slow rate, which is feasible and consistent with the operation of the system, where the oil is to ooze slowly past the seepage fittings.

In the preferred embodiment, the dense filter is of large area preferably equal to that of the reservoir bottom and is clamped against said bottom 91 by an auxiliary flanged clamping plate 124 telescoped into the base of the reservoir, gaskets 125 and 126 being interposed to firmly grip the periphery of the filter, the pump cylinder communicating with the filter head through aperture 127. To prevent the possibility of tearing or rupturing the large-areaed filter under the substantial pressure applied thereto in the operation of the pump, it is preferred to form both the bottom 91 of the reservoir and the clamping plate 124 with registering pressed bosses 128 to firmly retain the filter pad 123 against deflection at a multiplicity of distributed points, as shown. The lubricant from the filter is fed to the headers 46 and 47 through a pipe, preferably flattened and soldered to the bottom of the clamping plate 124 and extending through the flange 91; communication from the filter head to said pipe being established through a series of registering apertures 130 through the clamping plate 124 and the upper surface of pipe 129. Clamping plate 124 has a reinforcing angle iron 124' mounted thereon.

It is apparent that the large dense filter 123 may be clogged after a relatively short period of use, if it is supplied with dirty oil. It is, accordingly, desirable to remove the coarser particles from the oil before it is drawn into the pump and forced through dense filter 123.

For this purpose, I provide a strainer cup, a preferred specific construction of which will now be set forth. The strainer cup 105 has a flange 106 resting about an aperture in the cover 107 of the reservoir. The bottom of the cap 105 is raised, as shown, and comprises a pair of apertured flanged screen plates 105' and 105'' preferably soldered thereinto between which is pressed a filtering pad 108. The strainer cup is held in position on the cover of the reservoir by means of two or more screws 109 threaded therethrough, the flange 106 having preferably soldered thereto an annulus 110 to afford the necessary thickness for the screws 109. The filling cup is normally maintained closed by means of a cover 119 pivoted as at 120 to the annulus 110 and maintained closed by a hasp 121.

From time to time, the strainer cup should, of course, be cleaned. It is removed from the reservoir for this purpose by first withdrawing the fastening screws 109. There is no likelihood in cleaning, of gathering any material quantity of dirt by temporarily standing the filter cup upon its base on the floor of the garage or other unclean place, since the area of the bottom is raised from contact therewith by the rim 122.

While the strainer cup is removed, in the absence of special provision, the interior of the reservoir would be exposed and dust or dirt might enter. To prevent this, a filter cup 112 is preferably provided permanently secured at its flange 111, as by soldering at 111' about the filling opening in the reservoir 89, thus preventing the entry of dirt or dust even when the filling cup 105 is removed. As shown, the screws 109 extend only partway through the thickness of flange 111, so that no dust can enter through the small screw holes otherwise left open by removal of the filling cup. The filter cup, as shown, has a bottom 114 apertured as at 115 against which there is pressed a filter pad 116 by means of a cap ring 117 soldered in place as at 118.

To charge the reservoir, the cover 119 is thrown back and oil is poured in through the strainer cup by which any solid particles are intercepted, and in its passage through filter cup 112, finer particles are intercepted by filter pad 116, so that only clean oil will enter the pump reservoir and cylinder. If the filter pad 116 were sufficiently dense to intercept even fine particles of dust carried in the oil, the filter pad 123 might be dispensed with. However, such fine filter would allow only extremely slow seepage therethrough under the small pressure of the low head of lubricant thereabove within the filter cup and the specific construction shown and described is, accordingly, preferred in which, the filter pad 116 is of such texture as to permit seepage of the lubricant therethrough at a slow but not unduly slow rate, the dense filter 123 being relied upon to abstract any minute remaining particles of dust when the oil is forced therethrough by pressure applied at the pump 93.

If the same grade of oil were used in my system winter and summer, it will be obvious that by reason of the much greater viscosity of the oil at low temperatures, the feed of lubricant to the bearings may be greatly retarded, particularly at the dense filter 123 and at the various seepage resistances or obstructions. I compensate for this by mounting the reservoir and pump as shown, in the vicinity of the engine, so that the supply of oil therein will be maintained warm winter and summer, as long as the engine is running, whereby regardless of the season or latitude, oil of substantially uniform viscosity would be forced through the dense filter 123.

Furthermore, it is desirable in many cases to provide a heating coil within the reservoir 89 and extending as shown, about the inner walls thereof and communicating preferably with the exhaust or, if desired, with the water jacket, so that warm gases or water supplied therethrough will maintain the oil in the reservoir warm. Preferably a cock H' is provided adjacent the inlet to the coil H to shut off the supply of heated fluid in warm weather. The inclination of the turns of the heating coil is preferably such that any water condensed in the exhaust will readily flow out by gravity through the delivery or drain opening H².

In addition to or in lieu of the temperature compensating heating coil described, I preferably provide an auxiliary coil spring 102' attached at one end to the lever arm 99. The free end of spring 102' may be anchored to a hook (not shown) to provide additional spring pressure in winter for forcing the pump piston 94 downward to compensate for the increased viscosity of the oil.

*Lubrication of king pin and associated parts*

Referring to Fig. 13, the stationary king pin there shown has a fitting 131 threaded into the upper end thereof in lieu of the ordinary oil cup, and is provided with a longitudinal inlet passage 132 through which lubricant is supplied to the king pin. The clevis 41, and if desired, the steering joint 67 also are lubricated by oil from fitting 131, passing through a swivel 133, which permits rotation of the steering knuckle and associated third and steering arms relative to the king pin without leakage. The swivel joint comprises a ring or female element 134 having a conical aperture 135, snugly fitting the conical male member 136 on fitting 131, and is maintained in place by a spring washer 137 and lock ring 138. A rigid pipe 139 connects the swivel element 134 to the clevis joint 41 at the end of the third arm 40. A branch 140 may be tapped from pipe 139 to supply lubricant to the steering arm joint 67. In a socket 142 in the lower end of fitting 131 is a seepage mass restriction or obstruction 143, in this embodiment a tightly packed plug of felt or the like, held under compression by an adjustable threaded plug 144 apertured as at 145 for passage of the lubricant to the king pin. The lower end of the pipe 139 has a seepage fitting S preferably similar to that shown in Fig. 3 and described above and connected to the clevis bearing 41. A similar seepage fitting S similarly connects branch pipe 140 to the steering arm joint 67. Thus, it will be seen that the lubricant is urged when pressure is applied thereto, through passage 132 to seepage plug 143 to the king pin 39 and in parallel therewith through the radial duct 141 and circumferential passage 141' within the male swivel 136 to and through pipe 139 to supply the seepage fitting S and through branch pipe 140 through the corresponding seepage fitting S to supply joint 67.

It will be seen that in the construction set forth no flexible piping is required, the swivel element 134 rotating as a unit with the steering knuckle, steering arm and third arm during the steering operation and always affording communication for lubricant from the fixed king pin fitting 131 to said relatively movable elements.

In the embodiment just described, the pressure from the pump is transmitted to the seepage plugs through the swivel joint 134—136. In certain cases, it may be preferable to relieve the swivel surface from lubricant pressure by dissipating or absorbing the pressure in one or more of the seepage plugs before the lubricant reaches the swivel. For this purpose, the alternative connection shown in Fig. 14 may be used. In this embodiment instead of the fitting and associated parts of Fig. 13, I employ a fitting 146 carrying cartridge 147 fitted into a transverse tapped opening 148 therethrough and closed by an adjustable screw plug 149 to apply pressure upon the seepage plug material 150 in the interior thereof.

A ball relief valve 151 is pressed by spring 152 against seat 153 in the cartridge 147. The upper end of the fitting 146 is of a frusto-conical form and has frictionally fitted thereon the complementary female or ring swivel element 154. An oblique duct 155 communicates from the delivery side of the relief valve 151 in the fitting through the male swivel element 146 to the circumferential groove 156 therein and to the female element 154 from which the lubricant is fed through a pipe (not shown) generally similar to pipe 139 in Fig. 13. A seepage plug 157 extends axially of the fitting 146 across the diagonal duct 155 and is adjustably compressed into socket 158 by a screw plug 159 at the upper end of the fitting.

In the operation of this construction, it will be seen that the lubricant is forced past relief valve 151 through seepage plug 150 to supply the king pin and in parallel therewith through the diagonal duct 155, seepage plug 157 and groove 156 to supply the third arm either alone or in parallel with the steering arm. Thus, it will be seen that the pressure upon the lubricant for the tie rod clevis and steering arm joint is absorbed in the seepage plug 157 in advance of the swivel joint and the latter will, therefore, remain oiltight even after prolonged use and ordinarily without the need for packing. Since the lubricant emerges from the swivel at low pressure it may, in certain cases, be desirable to employ a wick in the piping 139 for feed of the lubricant therethrough to the clevis joint.

The embodiment of Fig. 14 is intended for supplying two bearings. Where it is desired to supply lubricant to three or more bearings, for instance, to a king pin, a steering knuckle and a tie rod clevis without applying lubricant pressure at a swivel element, the construction shown in Figs. 15 and 16 is preferably provided. In this embodiment the king pin is illustratively shown, as of the rotating type. The fitting 160 is threaded into the king pin by a nipple 161 and a female swivel element 162 is fitted about a corresponding male swivel portion at the upper end of the fitting. The lubricant supply pipe is applied at an integral lateral wing 163 in the swivel element 162 through a relief valve fitting 164 threaded thereinto, comprising a ball valve 165 maintained against its seat by a coil spring 166. Three plugs of seepage material are fitted into corresponding depressions or wells in the wing, extending one preferably horizontally as at 167, one sloping upward as at 168 and the third, as at 169 downward, said wells being supplied in parallel with oil admitted through the relief valve 165, entering the wells in succession through a transverse duct 171 beyond the ends of the seepage masses. The wells are sealed at their outer ends by plugs 170. Ducts 172 connect the lower ends of wells 169, 167 and 168 at different elevations with corresponding peripheral grooves 174, 173 and 175 in the male fitting, groove 174 communicating with a longitudinal passage 176 for lubricating the king pin, the other grooves 173 and 175 communicating through oblique ducts 177 with outlets 178 for supplying the other bearings.

In a construction of the general type shown in Fig. 13 in which the lubricant is forced under pressure past the swivel element to the seepage resistance, it is desirable to use a relief valve, which may be of the general type of that shown as an element in Fig. 3 in advance of the swivel. Thus, even if the swivel is relatively loose, the line will not be emptied, by leakage therefrom, since the relief valve in advance thereof maintains it filled.

Spring shackle and bolt lubrication

The ordinary spring shackle (see Fig. 2) is supported on the chassis frame 179 by a support bolt 180 which extends through sleeve 181, rigidly connected to the frame 179. The shackle side plates 182 and 183 rotate with bolt 180 and the lower ends of the said plates carry a second bolt 184 which is encircled by the eye 185 of the spring. The bolts 180 and 184 have the usual tapped sockets 186 for oil cups and are secured in position by nuts 187.

Lubricant for the bearings is fed through the usual ducts 188 in the bolts by means of a swivel joint fitting 189 generally similar to that shown in Fig. 13 and described above, threaded preferably into the end of the upper bolt in lieu of an oil cup. In this embodiment the intake passage 190 extends through the female element 191 of the swivel, a circumferential groove 192' about the male element connecting said intake duct with the longitudinal passage 193 through the fitting by means of radial duct 192. A flat metallic ring member 194 is clamped between the fitting and the bolt 180 interposed washers 196 rendering the connection oil-tight. A similar ring 197 is clamped by a seepage fitting (shown in Fig. 2a) against the lower spring shackle bolt 184 and the two rings 194 and 197 are connected by a small tube or pipe 198, the ends of which are preferably soldered into corresponding depressions in the rings and communicate with the interior peripheries thereof through radial ducts 199 therein. The seepage plug fitting of Fig. 2a comprises a screw plug provided with a head 200 and a restriction or obstruction 201 as of felt, forced into a socket in the lower end thereof and adjustably held under pressure by a threaded plug 202 pierced by a longitudinal hole. The screw plug has a transverse passage 203 in registry with duct 199 communicating through longitudinal passage 204 with the seepage mass 201. It will be seen that upon application of pressure, oil is fed through the swivel 191 and the associated seepage mass to the upper bolt 180 and in parallel therewith to the lower bolt through pipe 198, ducts 199, 203 and 204 and seepage mass 201 to the bolt 184. It will be understood that if it is desired to relieve the oil pressure from the swivel joint, a construction similar to that shown in Figs. 14, 15 and 16, for instance, may be employed instead of that shown.

By the swivel connection described, it will be understood that lubricant is supplied without leak, to the bolts 180 and 184 to provide lubrication at the carrying sleeve 181 and the spring eye 185 respectively. Bolt 180 rocks and bolt 184 moves through an arc about the former as a center, in the compression and return of the vehicle springs in use.

The spring bolts at the forward ends of the vehicle springs of Fig. 1 are supplied preferably by fittings as that of Fig. 3, threaded directly into the end of the bolts in lieu of oil cups, the length of the fitting extending lengthwise of the vehicle as shown, to obviate projections likely to be broken off.

Alternative conduit element

The conduit section at the left of Fig. 1 supplying lubricant toward the front axle for the left king pin, is preferably identical with that at the right, but an alternative form is shown in the drawings, in which the support runner 231, Fig. 8, is dispensed with and the conduit extending to the front of the channel frame is curved with a short helix 62' near the forward spring bolt, and extends rearward along the spring, to the front axle, whence it passes laterally to the king pin 13. The portion of the conduit along the spring has an undulating form as at 63' as shown, to afford the flexibility to permit operation of the supporting spring 31. A tap 64' in advance of helix 62' effects connection from the main to the forward spring bolt through the seepage fitting S.

Operation

To lubricate the bearings upon the chassis, the pump 17 is charged by simply pulling on the handle 101, Fig. 17, to raise the pump piston 94 to the extremity of its stroke. Thereafter slow lubrication automatically takes place for a prolonged period at all of the chassis bearings in the following manner. In the elevation of the pump plunger, spring 102 is stretched and lubricant is drawn past the check valve 103 to fill the pump cylinder. The spring 102 tends to force the lubricant out of the cylinder past the relief valve 104 into the filter head 123 and through pipe 129 to the headers 46 and 47, Fig. 1, toward the bearings, check valve 103 preventing return to the reservoir. By reason of the oil-tight character of the pipe line, the lubricating oil will not leak under pump pressure and can escape only past or through the high resistances of the seepage fittings at the various bearings. The resistances obstruct the flow of lubricant, preferably to such extent that the pressure exerted by extended spring 102 upon the pump plunger is sufficient to merely effect slow seepage of the lubricant past said resistances and the associated valves to the bearings at a rate of a few drops per minute, at each bearing. The lubricant is thus slowly forced by the piston 94 past relief valve 104 through filter 123 where such fine dirt as may have escaped the first strainers is filtered out. Preferably the pump charge is equal to the volume of oil to charge all of the bearings on the line.

The resistance of the seepage fitting is so high compared to the combined resistance of the conduits and of the bearings that said seepage fitting resistance practically alone determines the rate of flow to the bearing, the magnitude of any drop of pressure in even the longest line being small compared to the drop in the seepage fitting. It will thus be seen that accurate distribution of oil to the bearings is effected throughout the period of pump discharge, substantially regardless of the length or frictional resistance in the piping, or of the tightness or looseness of the bearings.

The pressure transmitted to the oil by pump piston 94 remains substantially constant throughout the stroke of the pump, since, as spring 102 contracts and the force exerted thereby decreases, the effective lever arm thereof increases. After the pump is charged, the high pressure applied thereby will promptly and substantially concurrently effect opening of all seepage fitting relief valves 75 on the line, substantially regardless of diversities therein, and will maintain the latter open until the pump charge has been slowly forced through the high resistance seepage plugs, when the pressure subsides and the relief valves both at the pump and at the seepage fittings close and maintain the lines filled with oil.

For winter operation, the cock H' is opened for admitting exhaust gas or heated water from the cylinder jacket to the heating coil H to reduce the viscosity of the oil for facilitating its passage through the dense filter 123. Instead of preheating the oil, additional pressure may be applied to the pump by setting the auxiliary spring 102'. When the weather is very cold, it may be preferable to employ both the heating coil and the spring adjustment to compensate for the increased viscosity of the oil.

If the discharge of the pump were attempted by a direct manual effort, the operation of my system would be relatively difficult, for the seepage resistance fittings and the filter 123 would permit only the slow operation, heretofore noted, of the pump, so that the manual effort would have to be applied for a relatively long interval to discharge the pump. On the other hand, in a system in which the pressure is relieved upon the initiation of oil flow, the application of a pump discharge pressure rising from zero as it would in the direct manual operation, might result in relief of the pressure at one bearing, when a definite pressure is reached, with escape of all or much of the oil therethrough, the pressure failing to build up for lubricating some or all of the remaining bearings.

Moreover, in a lubricating system permitting of rapid execution of the pump pressure stroke to lubricate the bearings under pressure, it will be apparent that an impetuous person, or one ignorant of the operation of the system might by rapidly repeated operation of the pump flood the bearings and cause overflow to the floor or road. It will further be seen that in such system, the effort applied by the operator would have to be greater in winter than in summer in view of the greatly increased viscosity of the oil at low temperatures.

In my system, the maximum discharge pressure is applied to the line at the outset, and this greatly exceeds the opposition of the seepage fitting valves, which open substantially concurrently without, however, relieving the pressure, the resistance of the seepage obstructions reliably determining the slow distribution desired. The operation of my system, it will be noted, requires substantially no greater manual exertion in winter unless the auxiliary spring 102' is used, being at all times merely the effort needed to extend the spring to draw into the pump a charge of oil. The spring exerts its sustained pressure without further attention until it has discharged the pump contents. Moreover, in my system, a repetition of the operating manipulation of the pump will not increase the extremely slow rate of descent of the pump piston, and the amount of oil passing through the seepage resistances during the period of manipulation remains the same without flooding or overflow, regardless how rapidly the pump operation is repeated.

In a lubricating system with oil filled pipe lines to be held closed by relief valves against escape of oil, except when pressure is applied, if a small particle of dirt should become lodged between one of the relief valves and its seat, the valve may be held slightly raised from its seat, allowing oil to leak therethrough and impairing the efficacy of the system. Moreover, if the oil is forced through small outlet openings, small quantities of dirt or sediment carried with the oil may diminish the rate of flow and ultimately clog one or more outlets and in the further operation of the system only the unclogged lines will feed lubricant until they, in turn, become clogged.

By my arrangement of filters, I effectively guard against the admission into the system of any but clean oil even though the pump reservoir be charged with dirty oil, so that the seating of the valves is assured when the discharge of the pump is completed, and the clogging of small outlets or seepage resistance is prevented.

In my system, the rate of flow in each line depends merely upon the seepage resistances and the pressure due to the pump for oil of given viscosity. Increase of pump pressure increases the rate of flow at all the bearings; increase of seepage resistance, if adjustable resistances are employed, at any bearing decreases the rate of flow thereto, without affecting the flow to the other bearings. Thus, by simply setting each seepage obstruction to the desired resistance, the percentage of the total pump charge delivered therethrough can be readily adjusted. The resistance of each of the seepage fittings remains substantially constant even after prolonged use because the lubricant is freshly filtered on its way thereto and thus, no impurities are allowed to pass through or into the plugs for clogging the same, and the advance filter plug 83 in the seepage fittings provides a further safeguard against clogging of the seepage plug by any scale or chips picked up in the line of flow.

The seepage resistances impeding the flow to an extent compared to which the frictional resistance of the pipe and of the bearings is small and the rate of flow being exceedingly slow, it is apparent that there is no considerable drop of pressure in the line, and the pressure per unit area is substantially the same at a seepage fitting remote from the pump as at one adjacent thereto. The system being thus essentially equi-potential at all points on the line, it will be seen that additional outlets or seepage fittings may be applied wherever required in the line, without other change and without in any way impairing the efficacy of the system.

My system, it is seen, is broadly analogous in operation to an electrical circuit, in which high ohmic resistances connected in parallel correspond to the seepage resistances, a generator or battery corresponds to the pump and electric conductors connecting the ohmic resistances to the source of electromotive force correspond to the pipe lines. The lubricant is forced in parallel through the seepage fittings in which the pressure is absorbed, and passes on to the bearings at a rate inversely proportional to the resistance of each plug, the latter being ordinarily set and sealed initially for distribution of any charge of oil in definite proportions.

Precautionary devices

If desired, stop cocks may be provided in the main conduits as at X Figs. 1, 6 and 7, and preferably adjacent the headers 46, 47. If a break should occur in any portion of the line, the corresponding stop cock is manually closed to shut off the pressure from the leaking line without in any way interfering with the continued slow flow of lubricant through the other lines.

A preferred form of stop cock is shown in Figs. 6 and 7 and preferably comprises a pipe fitting 205 threaded at opposite ends as at 206 for application in the line, a frusto-conical valve member 207 being urged by a dished spring washer 208 into firm coaction with a corresponding seat 209 in the fitting. The valve has a transverse opening 210 in alignment with bore 211 of the fitting, when shoulder 212 on the valve head 213 contacts pin 214 in the fitting. The valve has a fillister slot 215 for application of a screw driver to turn the same from the open position described through 90 degrees to the other extreme or closed position shown, in which the pin 214 is contacted by shoulder 216 to bring the transverse passage 210 through the valve to a position at right angles to the bore of the fitting for sealing the pipe.

Preferably in advance of each helically bent or other flexible portion of the conduit, I provide a "rapid flow" valve, the locations of which are indicated in Fig. 1 at 22, one of such valves being shown in advance of the helix 62 through which the rear axle is supplied, and others in advance of the helices 234 and 62' at the front of the vehicle. The rapid flow valve is designed to allow the slow feed of lubricant to the seepage plugs but upon a leak or rupture developing in the line therebeyond, this valve functions to automatically close the line, so as to prevent rapid discharge of the pump contents through the break.

In the preferred embodiment, the rapid flow valve (see Fig. 22) comprises a cylindrical pipe fitting 217 within which is a piston head 218 secured to a piston rod 219, the lower end of which extends into a corresponding axial aperture 220 in the end 221 of the fitting as shown. A spring 222 encircling the piston rod urges the head to its outermost position. The piston rod has an axial aperture 223 therein, having a cross hole 224 normally in communication with the interior of the cylinder, the latter communicating with a longitudinal hole 225 parallel to the stem 219. Preferably the fitting has a screw cap 226 in advance of the piston head 218 having a seat 227 for a ball relief valve 228 maintained closed by spring 229 when the pump is not charged. The spring reacts against perforated disk 230 clamped by the screw cap 226 against fitting 217.

In the operation of this device, since the rate of flow to the seepage plug is slow, this can take place by traversing the bore 223 of the piston rod and the cross hole 224 therein to the chamber below the piston head, thence by the axial hole 225 of the fitting to the outlet pipe. In case the latter should break, there would be a tendency of oil to rush out through it by reason of the sudden relief of counterpressure or resistance. The pressure originating in the pump would, therefore, depress the piston head through its full stroke, shifting the cross hole 224 into the main bore 220 of the fitting, cutting off the oil feed and thus preventing escape of oil into the broken pipe. This position will be maintained so long as the oil is under pressure, but when the pressure ceases after the pump has forced its contents through the seepage fittings in the other lines, the spring 222 returns the valve to the open position indicated in the drawings. In this position, the oil contained in the pipe would run out slowly by gravity in the event that the piping be not air-tight but this is prevented by the relief valve 228.

Alternative forms of conduit elements

Fig. 9. This shows an alternative form of conduit section which may be substituted for that shown in Fig. 8 or at the left front end of Fig. 1. In this form instead of the helically bent solid bridging portion, I employ flexible piping. In the specific embodiment shown, the runner 238 supported by a spring 239 at one end upon the axle and by a spring loop 240 at the other end to the chassis frame, is generally identical with the arrangement of Fig. 8. Upon the runner is fastened a solid metal pipe 241 to the intake end of which is connected a flexible hose 242 and to the delivery end of which is connected another flexible hose 243 leading to the bearings. The connection from the main 49 to the flexible hose 242 is established through the T joint T to the nipple of which is connected, through a short length of pipe 244, one of the elbow-shaped seepage fittings S emptying into the upper end of the flexible hose 242. It will be noted that I have mounted the seepage fitting in advance of the flexible hose, so that the oil after seeping slowly through the seepage fitting S will pass on by gravity through the flexible hose to and through the inclined solid pipe 241 on its way to the bearings. The flexible hose is thus empty and not subjected to the oil pressure in the line, and the difficulty of leakage is obviated.

Figs. 10 and 12. This construction includes a light rigid member 245 which may be a wooden board as in Figs. 8 and 9 and is supported between the cross bar of the frame and the rear axle by helical springs 246 and 247, the axes of which preferably extend longitudinally of the vehicle. The seamless small diameter metal conduit pipe is wound into a helix 248 about the spring 246 and thence extends longitudinally of the runner 245 and is secured thereto by staples as at 249 and the opposite end is wound into a helix 250 about spring 247, the free end extending therebeyond as shown in Fig. 1, along the rear axle in the manner already described. The solid metal conduit tube is thus given flexibility by its helically wound portion and is supported against vibration by the steel springs on which it is carried at the hinging points while it is prevented from whipping and other damage between the point of flexure by the rigid member 245 by which its main length is carried.

Fig. 11 shows the conduit helix supported between the convolutions of the helical spring 251 and in Fig. 12 the convolutions of said conduit are shown resting in the hollows 252 of a specially shaped steel spring 253.

In Fig. 21 is shown an alternative embodiment of conduit connection to the rear axle advantageously applicable to vehicles having a torque tube rigidly connected to the differential casing, a single universal joint 255 being provided at the forward end only of the propeller rod. In this application, it is preferable to extend the conduit for supplying lubricant to the rear axle along the torque tube 256 anchoring it thereto by means of staples as at 257, transverse pipes 258 connected with pipe 259 by a T joint T and stapled to the rear axle housing, effecting the distribution of lubricant to the brake linkage in the manner heretofore described and shown in Fig. 1. The torque tube and the rear axle housing being a rigid suit, no flexible conduit connection is required to the rear of the universal joint 255. To permit the relative movement of conduit portions 258—259, rigid with the rear axle housing and torque tube, with respect to those carried on the vehicle frame, the portion of the pipe adjacent the universal is wound into a helical conformation 260 disposed laterally thereof, forming a liquid-tight hinging connection, one end of the helix being secured by a staple 261 to the chassis in advance of the universal joint and the other by a bracket 262 to the torque tube at the opposite side of the universal joint.

*Alternative means for applying pressure to the lubricant*

In Fig. 18 is shown an alternative pressure applying arrangement to dispense with the need for any special manipulation to charge the pump, this work being performed in small steps by one of the pedals or levers which is moved from time to time in the normal operation of the vehicle. In the embodiment shown, the oil tank T' communicates through a check valve 265 with a pressure pump 266 of small capacity in the order of about a thimble full, communicating through relief valve 267 with a small air bottle 268 in communication with the various bearings, through a relief valve R near the delivery end of said bottle. The pump has a piston 269 connected through link 270, bell-crank lever 271 and pitman 272 to preferably the brake pedal 273. The parts are normally in the position shown in the drawings. Upon any depression of the brake pedal 273, the piston 269 will be depressed to force the charge of oil therebelow into the small air bottle 268 which thus acts as a hydraulic accumulator, the pressure of the compressed air therein serving to slowly expel the lubricant through seepage fittings of the type previously set forth to the bearings, check valve 267 preventing return of oil from the pump to the reservoir, and relief valve R preventing communication to the line except when air bottle 268 is charged at least to the minimum high pressure required to concurrently open all of the valves on the line. When the brake is released, the return spring thereof 274, through linkage 272, 271, 270 again raises piston 269 drawing in a fresh charge of lubricant past check valve 265.

The energy expended in operating the small volume pump is so small compared to that of operating the brake that the added load is substantially negligible. The repeated small charges of oil to the air bottle occurring in normal operation of the vehicle are sufficient for maintaining the system under the desired pressure and will effect a continual slow feed of lubricant to the bearings, without any attention whatsoever on the part of the operator, other than filling the reservoir when required.

In Figs. 19 and 20 is shown means to automatically recharge the pump after each discharge. The power for charging the pump is preferably derived from the engine in any suitable manner as by the intake suction, the exhaust pressure or the compressed charge within a cylinder. Each time that the pump plunger reaches the bottom of its stroke, it is automatically connected to the engine to return it to the top of the stroke, again charging the pump and continuing the lubrication.

Referring to the drawings which show a preferred intake manifold vacuum operated embodiment, the upper end of the pump plunger 275 is connected to a piston head 276 sliding up and down in a vacuum power cylinder 277 provided with a small port 278 in its bottom for escape of air on the operating stroke. The top of this cylinder is closed tight and from it a pipe 279 extends to the automatic valve 280, thence to the hand-operated control valve 281 and thence to the intake manifold 282. The automatic valve has an L-shaped port 283 which in one position connects the vacuum power cylinder 277 with the intake manifold and in the other to atmosphere. The hand-operated control valve may be of conventional form. A lever 284 linked as at 285 to the stem 275 of the pump plunger is pivoted on the axis of the valve 280. The lever is provided with a pin 286 to strike stop 287 when moved toward the left and stop 288 when moved to the right. Both stops are on a quadrant 289 fixed to the valve 280 to snap the valve against stop 291 and stop 292 respectively on the valve casing, by the action of a coil spring 290 which connects the quadrant and the valve to the valve casing and functions when shifted past the axis of the valve. In the position shown, the plunger is down and lever 284 has shifted spring 290 past the axis to snap the valve 280 against stop 291 to establish the valve connection from the intake manifold to the power cylinder 277. Suction is thus applied to the power cylinder above piston 276 which is thereby elevated, air being admitted through vent hole 278 in the bottom of the power cylinder. When the power piston head reaches the top of its stroke, the lever 284 linked to the stem has reached a position where the pin 286 thereon presses against the stop 288 of the quadrant on the valve and throws it over dead-center, so that the spring snaps it to its upper position against stop 292, cutting off the vacuum and admitting atmospheric pressure to the top of the piston head through passage 279, whereupon the spring in the pump slowly returns the piston 276 to lowermost position in forcing lubricant slowly through the seepage fittings to the bearings.

The apparatus described is particularly suitable though not limited to the lubrication of vehicles where continuous or non-manual lubrication is desirable, since it substantially assures a continual slow lubrication of all chassis bearings, while the vehicle is running, the pump being immediately recharged automatically, as soon as it is discharged.

A wire $w$ connected to the plunger 275 has a hand ring $r$, accessible from the front of the dashboard, affording auxiliary means to charge the pump by hand.

*Alternative seepage fittings*

Fig. 23 shows an alternative seepage fitting of general application, which has a number of features in common with the fitting shown in Fig. 3 and differs therefrom mainly in affording adjustment of the rate of flow thereto, and in embodying the seepage resistance and the valve in a single element. This fitting comprises a cartridge or shell 293 for the seepage resistance threaded into and supported by a transverse retaining support sleeve 294 formed integral with a nipple 295 for application to the bearing box, bolt or other element to be supplied with lubricant, although obviously the nipple and cartridge element may be formed of an integral piece. The cartridge 293 has an annular seat 296 at its inner end for a valve 297 substantially as in the preferred form of Fig. 3. In the present embodiment, the valve has a stem 299 rigid therewith, extending longitudinally through the corresponding bore 300 in the fitting. In the preferred embodiment, the stem is of diameter in the neighborhood of .002" smaller than that of the bore, as and for the purpose set forth in the description of the embodiment of Fig. 3 above. The valve is normally maintained upon its seat by a coil spring 301 encircling a central stud 302 integral with the valve head and maintained under compression by a screw plug 303 threaded into the end of the tapped opening 304 in the retaining sleeve 294 and having a depression 305 within which the coil spring seats. In the intake end of the cartridge is placed the filter plug 306 of felt, cotton or similar porous material, a short length of which fits snugly without appreciable compression within the somewhat enlarged end of the bore 307 adjacent the end of the valve stem, said plug having a portion projecting outward into a passage 308 of larger diameter in the end of the cartridge to expose the lateral surface of the plug as in Fig. 3. The fitting is threaded at its end 309 for application of the conduit pipe in the same manner as in Fig. 3. The operation will be obvious from that of the embodiment of Fig. 3, set forth above.

When the pressure in the pump subsides, so that the sum of the pressures exerted upon the end of the valve stem and the lower surface of the valve head is no longer sufficient to overcome the counterpressure of the spring 301, the latter forces the valve 297 against its seat and prevents further flow. It will thus be seen that the valve 297 with its stem 299 performs the combined function of a seepage resistance to absorb pressure in the line and of a valve to maintain the line closed against escape of lubricant and entry of air when the pump is not under pressure. By adjusting the compression plug 303 of any one of the fittings in an installation, the counterpressure of the coil spring 301 thereof may be increased or decreased to decrease or increase the rate of lubricant flow to the corresponding bearing. It will be seen that if the counterpressure of the spring is increased, the valve will reseat against the opposition of a higher residual oil pressure to interrupt the flow of lubricant, while if it is decreased, reseating will occur only after the oil pressure has dropped sufficiently to be overcome by the lesser spring pressure. With various seepage fittings of the type shown in Fig. 23 adjusted to deliver various amounts of lubricant when fed from a common source, the distribution of oil to the various bearings will proceed at the desired rate throughout the slowly executed pump discharge stroke.

Thus, a charge of oil from the pump may be distributed to the bearings in a lubricating installation either alike to each bearing or otherwise as desired, by appropriate setting of the compression plugs 303, and adjustment may be readily effected in the compression plug of any fitting to regulate its flow if the bearing receives too much or too little oil, and this without in any way interfering with the rate of feed through the other fittings.

In Fig. 23a is shown a modification of the fitting of Fig. 23 in which the valve stem is formed of a single blank of pressed metal having a hollow stem 311, a long counterpressure spring 312 being employed, extending into the hollow stem 311 and reacting against the closed end 313 thereof.

Another alternative form of seepage fitting is shown in Fig. 24 and comprises an elbow-shaped pipe fitting having a shell or cartridge 470 and an integral nipple 471 for application to the bearing, bolt or other element to be lubricated, in lieu of an oil cup. The cartridge 470 is closed by a relief valve cap 472 threaded thereon at one end to which the end of the pipe is connected by means already described, and a plug 473 is threaded into the cartridge at the other end. The seepage resistance element comprises a wick 478, preferably a mass of tightly packed felt, snugly fitting within the bore 479 of the cartridge. A spreading plug 480 provided with a sharp point 481 is threaded into the end of the cartridge and serves to spread or mushroom the end of the felt plug as at 482 into the enlarged end 483 of the bore to form a filtering element. The relief valve may be an ordinary ball valve 484 tightly pressed against its seat 485 by a coil spring 486, the latter reacting against a perforated disk 487 clamped by the screw cap 472 against the end of the cartridge, the spreading plug 480 having a passage as at 488 to permit flow of lubricant to the seepage material.

The plug 473 has a cylindrical teat 473' of only slightly smaller diameter than the bore of the cartridge and exerts pressure against the end of the seepage felt to compress the same to any desired extent.

In operation, it will be seen that when the oil is forced under pressure to the various fittings of the construction described, in parallel, the relief valves 484 will be forced open and the oil first passes through the relatively loose spread filtering portion 482, where any minute solid particles are filtered out, the clean oil being then forced through the tightly compacted cylindrical felt portion 478 in the bore 479, the pressure upon the oil being absorbed therein, so that it will ooze slowly drop by drop past the teat 473' and through the nipple 471 to the bearing. The mushroomed end of the felt affords passage for the oil of much lower resistance than the tightly compacted cylindrical plug, so that dirt or chips picked up in the pipe are removed thereby, and will, therefore, not clog the tightly compacted plug. The pressure upon the seepage mass may be increased or decreased to any desired extent and the rate of flow correspondingly decreased or increased respectively by appropriate rotation of the readily accessible plug 473 by means of a screw driver, substantially as in the embodiment of Fig. 23.

A further alternative form of seepage fitting is shown in Fig. 25. This comprises a pipe fitting cartridge 315 having a cap 316 threaded thereon and provided with a shoulder 317 clamped against the end of the flange 318 of a thimble member 319 extending into the interior thereof and accommodating the plug or seepage mass 320 therein, the end of said thimble being apertured as at 321 for transmission of the oil. An adjustable screw plug 322 similar to that previously described, except that it is here shown with a sharp point 322', coacts with the seepage mass to adjust the compression thereof and the rate of flow therethrough. The seepage plug filter comprises a strong perforated metallic cylindrical member 323 covered at the exterior by a filter cup 324, said elements being secured preferably against the thimble by any desired means, as, for instance, by the wire 325.

It will be noted that with this arrangement without increasing the diameter of the fitting, the area of the filter is many times greater than the cross-section of the seepage mass, so that the filter will not become clogged, although it has intercepted many times the quantity of dirt that would suffice to clog the seepage mass.

Another form of seepage fitting is shown in Fig. 25a, comprising an elbow-shaped fitting 326 of one integral piece, as in Fig. 3. The seepage mass 327 in the bore 328 of the fitting in this particular embodiment is spaced by a ring 329 from a thin or auxiliary filter disk 330 in turn spaced from shoulder 331 by a spacer cap 332 perforated as at 333. In this embodiment, the pressure screw plug 334 in the end of the fitting is shown with a circular flange projection 335 in lieu of the teat shown in other embodiments, and presses against the periphery of the end of the seepage mass 327, and is perforated as at 335' for communication with the nipple passage 336. The relief valve 337 is provided in the intake end of the fitting, as in other embodiments.

In operation, it will be seen that any dirt or dust passing into the fitting is intercepted by the thin filter disk 330, the clean oil passing on to the compacted seepage mass 327.

The fitting of Fig. 26 is closed at one end 338 and has an integral nipple 339 for application to the bearing or bolt. A metal plug 340 is threaded into the open end of said fitting and has a shank 341 of lesser diameter to afford an annular chamber 342 within the fitting. A valve 343 mounted upon one end of a leaf spring 344, the other end of which is secured by means of a screw 345 to the shank 341 of the plug, closes the cross passage 347 communicating with the axial duct 348 through the plug. The leaf spring is preferably set to urge the valve closed with a substantial minimum pressure and screw 349 accessible from the exterior of the fitting affords additional adjustable valve seating pressure. A filter plug 350 is preferably seated within a depression 351 in the end of plug 340 and is maintained in place by a spring washer 352 snapped into a corresponding groove.

The leaf spring 344 and screw 349 exert a valve seating pressure of such magnitude that the lubricant forced past the filter plug into the seepage fitting by the operation of the pump will unseat the valve but slightly to leave but a minute crack between the valve and its seat, affording a highly constricted passage for the lubricant, the pressure being frictionally absorbed as the oil oozes slowly therethrough. The slow feed of lubricant takes place until the counterpressure of the spring and screw overcome the pressure in the line when the valve 343 closes to prevent further exit of lubricant. Adjustment of flow to any bearing can be effected through screw 349 in the manner obvious from the description above of Fig. 23.

Figure 43:
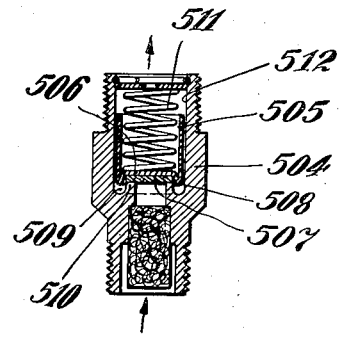
Figure 45:
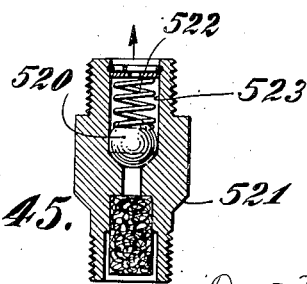

In this embodiment, it will be seen that valve 343 performs the combined function of a seepage resistance to absorb the pressure in the lubricant, and a valve to prevent leak of oil or entry of air. The embodiment of Fig. 23 above described, also includes a combined relief valve and seepage fitting, and further desirable embodiments of this general type are shown in Figs. 43 and 45 and described below.

The modification shown in Fig. 27 comprises an integral elbow-shaped cartridge fitting 353 into the branch 354 of which is threaded a nipple fitting 355 for application to the bearing bolt or the like, said nipple having therein a valve 356 with a seating surface 357 preferably identical with that of Fig. 3, pressed against seat 358 in the outlet end of the nipple by means of a tension coil spring 359 extending into the bore of the nipple and secured at its opposite end to a perforated washer 360. The spring 359 serves to concurrently press the valve against its seat 358 and the washer 360 against the end of the nipple. In the present embodiment, the seepage resistance includes a metal plug 361 having a fine thread, preferably a double or triple thread 362 upon the surface thereof, the apex of the thread determining a diameter equal to the bore 363 of the fitting to fit tight therein as shown, and maintained in position by a scalloped spring washer 364 snapped into a corresponding groove near the end of the fitting.

In operation, it will be apparent that the discharge pressure applied at the pump will through the column of oil in the filled pipe unseat the valve 356, the oil then flowing slowly past and through the minute helical passage or passages formed between the thread of the plug and the bore of the fitting, where the oil pressure is largely absorbed.

In this embodiment, as in the preferred embodiment of Fig. 3, it will be noted, the valve is at the exit side of the seepage fitting, as distinguished from the embodiment of Fig. 24 where it is located at the intake side. It is feasible to locate the relief valve alternatively either at the intake or exit side of the seepage resistance or to embody it as an integral part thereof as shown, for instance, in the embodiments of Figs. 23 and 26 previously described and Figs. 43 to 45 to be described below. In many relations, it is preferred to employ one of the former constructions, although beneficial results are derived from the use of the latter.

In Figs. 28 to 35 inclusive, are shown alternative forms of seepage fittings in which in lieu of a valve, a liquid or oil seal is provided to prevent leak of oil or entry of air. A flap check valve is preferably provided in each of the seepage fittings of this type, to prevent the entry of air into the line, for if air should enter through a fitting at a higher elevation, for instance, through one on the frame, oil might escape through the fittings on the axles, which are at lower elevations by reason of the head of oil in the piping between the two fittings. A satisfactory operative system will, accordingly, result by providing the flap check valves in the fittings on the frame and omitting them from the fittings on the axles. I have, accordingly, in most of the embodiments now to be described omitted the flap check valves, though it will be understood that each of said fittings may, if desired, or required, be provided with a check valve.

The fittings shown in Figs. 28 to 35 embody numerous alternative forms of seepage resistances or masses. All of these embodiments include a substantially identical fitting shell or cartridge element. This comprises a tubular pipe element 365 having a lateral nipple extension 366 for application to the bearing or bolt, to be mounted, preferably, though not necessarily, in vertical position, and closed at its lower end by a removable closure plug 367.

Figure 28:
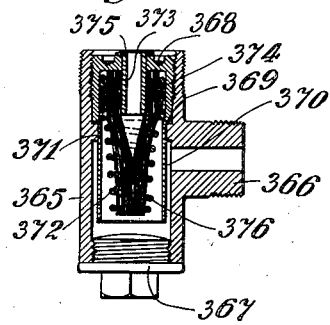

In Fig. 28 a plug 368 is threaded into one end of the fitting, the lower end thereof clamping a flange 369 formed on a downwardly extending cylindrical tube 370 against an inwardly extending ledge 371 formed in the cartridge. The tube 370 terminates above plug 367 and below the bore of nipple 366. The seepage material comprises a brush 372 of wires, bristles or other similar rods, fixed about an axial tube 373 as by a binding wire 374 and the projecting end 375 of the tube, in turn, is secured as by riveting over the end of the plug 368. The free ends of the bristles are pulled into a tight bundle by a helix 376 of corrugated spring wire which distends under oil pressure to lower the resistance and to correspondingly permit passage of oil therebeyond.

In operation, with the plug in the preferred vertical position, it will be apparent that oil will pass therefrom only when it fills the cartridge at least up to the level of the nipple bore, and the cartridge is, therefore, always full at least to that level. If the line beyond the seepage fitting is closed against entry of air, since the level of oil in the fitting is always above the lower end of the tube 366, the oil seal thus formed remains effective to prevent the entry of air into the line.

Figure 29:
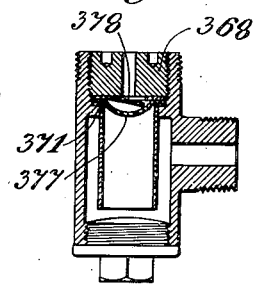

The embodiment of Fig. 29 is similar to that of Fig. 28 except that instead of the bristle brush, there is clamped between the end plug 368 and the ledge 371, a bowl-shaped piece 377 of parchment, calf-skin or similar high-resistance porous material. In this embodiment, I have shown, interposed between the bowl-shaped element and the plug, a leather or spring steel flap check valve 378 which automatically seats to prevent entry of air into the line. As heretofore indicated, check valves of this general type should be provided in at least the seepage fittings located above those at the lowest elevation in the installation.

Figure 30:
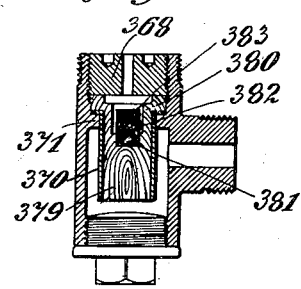

In the embodiment of Fig. 30, the seepage mass comprises a block 379 of wood or other fibrous, porous material having a flanged end 380 clamped against the ledge 371 of the cartridge by the closure plug 368, the length of the wood block fitting tightly within the metallic cylinder 370. Preferably, the block 379 has an axial depression 381 within which is snugly fitted a filter plug 382 which projects upward into a cavity 383 of large diameter to permit the preliminary filtering action heretofore described, for preventing the clogging of the block by the accumulation of impurities therein.

Figure 31:
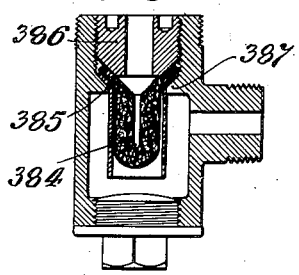

In Fig. 31 the seepage resistance comprises a bag 384 of felt, the edge 385 of which is tightly clamped by the plug 386 against the ledge 387. Preferably the clamping surfaces of the plug and of the ledge are in this case made oblique for greater effectiveness in the clamping hold.

Figure 32:
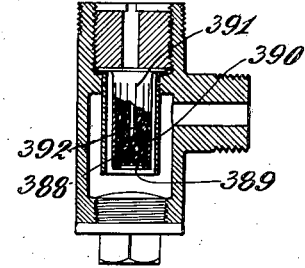

In Fig. 32 the seepage mass constitutes a plug 388 of felt, cotton or similar porous material held within and against the perforated disk base 389 of a metallic thimble 390, slit longitudinally as at 391. The seepage material is preferably provided with a longitudinal axial hole 392 so that the oil forced thereinto will pass through the plug not only axially through the perforated bottom 389, but also radially from the hole outward through the slits 391.

Figure 33:
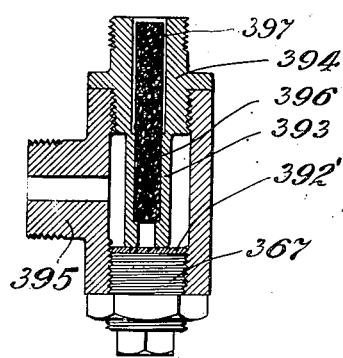

In Fig. 33 the seepage resistance comprises a disk 392' of tightly compacted felt or similar porous material pressed against the adjustable closure plug 367 by the integral sleeve shank 393 on the inlet plug 394. It will be apparent that the lubricant passes to the nipple 395 by being forced radially through the seepage disk in which the pressure is absorbed. In this embodiment, also a filter plug 396 is preferably employed fitting snugly into the shank sleeve 393 and extending with substantial clearance into the enlarged outer portion 397 of the plug 395, substantially as in other embodiments heretofore described.

Figure 34:
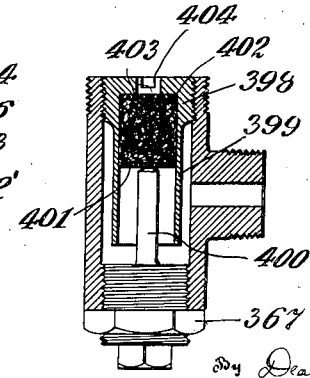

In Fig. 34 is shown a further modification in which the seepage mass is retained in the inlet plug member 398. Preferably the seepage mass which may be of felt, cotton, steel wool or other equivalent porous material is lodged within an integral sleeve shank 399 in the inlet plug, and the closure plug 367 is provided with an integral axial finger 400 pressing against a perforated disk 401 within the sleeve extension to uniformly compress the seepage material against a shoulder 402 in the plug, a similar disk 403 retaining the seepage material from being forced into the inlet aperture 404.

In Fig. 35 is shown a further modification in which the seepage mass 405 of felt, cotton or the like is disposed directly within the bore of the cartridge 365 and is compressed therein between a nut 406 at the intake end and a second nut 407 provided with an integral depending sleeve 408 to form an oil seal. A perforated disk 409 is interposed between the seepage mass and the nut 407 through which pressure is evenly applied to the seepage mass, forcing it against a projecting flange 410 on the nut 406, the seepage mass bulging under the pressure as at 411 into the depression within the flange 410 of nut 406 to press a disk non-return valve 412 against its seat 413 in said nut. Preferably the inlet end of nut 406 is provided with a filter plug 414 similar to those heretofore described.

In operation, it will be obvious that the lubricant will be forced past the filter plug to unseat the non-return valve 412 and through the seepage mass 405 where the pressure is absorbed and then past the oil seal through the nipple to the bearing. Entry of air is prevented by the oil seal and also by the non-return valve 412 which is seated firmly by any return impulse.

In Figs. 36, 37 and 38 are shown alternative forms of straight as distinguished from elbow-shaped fittings. These fittings are of general application, although as will be apparent the elbow fittings are in general more suitable for application direct to the bearings. The straight fittings to be described have their preferred application at places in the run of the line rather than directly to a bearing.

In Fig. 36 is shown a cylindrical fitting closed at one end by an inlet plug 415 and at the other by an outlet plug 416 between which plugs there is confined a scalloped dished spring washer 417, the edge of which presses upon the outlet plug, a metal plug 418 serrated as at 419 about its periphery snug within the fitting, resting against the convex surface of said spring, a sleeve member 420 of felt, cotton or other porous or pressure absorbing material being pressed between said block 418 and said inlet plug 415. The block is preferably provided with a boss 421 extending snugly into the sleeve to prevent collapse thereof.

The ring 420 is substantially compressed by the pressure of spring washer 417, transmitted through plug 418, so that in an installation equipped with the seepage fittings of Fig. 36, the annular seepage mass would have its maximum resistance against oil flow as long as the oil is not under pressure. When oil pressure is applied to the line, pressure is exerted against boss 421 of plug 418 through the lubricant within the annular seepage mass, which tends to displace said plug to correspondingly relieve the axial pressure upon the annulus, so that the resistance to radial flow therethrough is lessened somewhat and the oil passes slowly through serrations 419 and past the scallops of spring 417.

The form of Fig. 37 involves a cylindrical pipe element cartridge having an integral inner ledge 422 formed with a short integral axial tube 423. The outlet plug 424 is formed with a cup-shaped inner end 425 telescoped over sleeve 423 to provide clearance both with respect to the pipe element at its exterior and the sleeve 423 at its interior. An oil seal is thus formed as will be apparent, and ducts 426 afford communication therefrom to the outlet passage 427. The seepage resistance in this embodiment comprises a multiplicity of small short wires 428, forced as a tight bundle into a central aperture 429 in a thick circular washer 430 of lead or similar compressible metal. The block is maintained against the flange or seat 422 within the fitting by an inlet plug 423' threaded into the cartridge. The compacted bundle 428 of wires offers a multiplicity of minute passages for the lubricant in which the pressure is, of course, absorbed.

A preferred form of straight line seepage fitting which has the advantage of being adjustable to regulate the rate of flow from the exterior is shown in Fig. 38. This fitting is composed of nut 472' threaded upon a sleeve 470' within the bore of which is tightly compacted a rod of felt or similar porous material 478'. A plug 431 threaded into the interior of the sleeve is provided with a teat 432 which engages and spreads the inlet end of the seepage mass for forming a mushroomed filter portion 433 under reduced compression, within the enlarged bore end 434, substantially as in the embodiment of Fig. 24. The delivery plug element 435 of the fitting is attached to the sleeve 470' by means of a union screw cap 436 threaded thereover and having an inwardly extending flange 437 through which the sleeve 470' is passed in the assembly of the device, an interposed coil spring 438 maintaining the integral flange 439 on the sleeve pressed against the flange 437 on the screw cap. A metal pin 440 is preferably seated by tightly wedging at one end into a corresponding depression 441 in the outlet plug, the seepage mass being pressed against the free end 442 thereof. The pin has an axial slit 443 at the end fitting in the outlet plug, extending beyond the inner end of said plug to afford a passage for the lubricant to the outlet passage 444. The usual lock nut 445 maintains the device in any setting.

The operation of the fitting is immediately obvious from previous descriptions. To regulate the rate of flow, the lock nut 445 would merely be loosened and the union nut 436 rotated with respect to delivery plug 435, either toward the right or the left depending upon whether the compression is to be increased or decreased, to adjust the compression of the seepage mass. In tightening it will be apparent that the sleeve 470' is drawn inward toward the outlet plug 435 against the resistance of spring 438, while the pin 440 prevents movement of the seepage mass with the sleeve, so that the seepage mass is proportionately compressed.

To permit of applying at will, a charge of oil under pressure to some one bearing, requiring an extra charge with the use of my system, it is desirable to employ a seepage fitting with a by-pass about the seepage resistance which may be opened by a manual operation to allow squirting of lubricant under the pressure prevailing in the system to the bearing.

A desirable embodiment of construction for accomplishing this purpose shown in Fig. 39, comprises a fitting 446 having a threaded end 447 for the pipe line and a nipple 448 for the bearing and enclosing in the interior thereof a seepage mass 449, a check valve 450 and the compression screw plug 451 of construction previously described. In this embodiment, a perforated disk 452 is shown interposed between the seepage plug 449 and the seating shoulder 453 and a similar disk 454 is interposed between the opposite end thereof and the compression plug 451. A by-pass duct 455 through the plug about the seepage material is normally closed from the main bore 456 of the fitting by a valve plunger 457 seated by the pressure thereagainst of the coil spring 458 located in the cavity 459. The valve stem preferably extends through a bushing 460 threaded into the casting 446 and is provided with a circumferential groove 461, communicating with a radial duct 462 which in turn communicates with a longitudinal groove 463 in the valve stem. A pin 464 in the bushing extends into groove 463 to maintain the valve against rotation. The valve stem has an operating thumb piece 465 preferably cup-shaped to telescope over the bushing when pushed inward. It will be apparent that by pressing the valve head inward against the resistance of spring 458, groove 463 will establish communication between the intake end of the main duct 456 and the by-pass 455, thus establishing a low resistance path for lubricant from the intake through groove 463, radial duct 462, circumferential groove 461 to duct 455 and thence through nipple 448 to the bearing. The resistance of the seepage material is removed from the path of flow while the thumb piece is depressed and the oil is squirted under the pressure in the pump to the corresponding bearing. Upon release of the thumb piece, spring 458 will return the valve 457 to closed position and the operation proceeds as in the ordinary seepage plug fitting.

Figure 40:
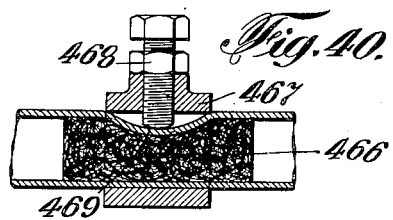
Figure 41:
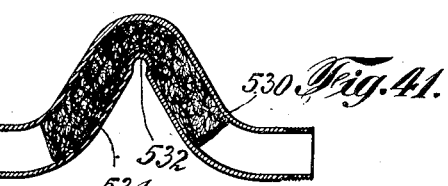

In Figs. 40 and 41 are shown simplified forms of seepage devices which while not affording the delicacy of compression and adjustment inherent in certain of the fittings previously described are useful in certain relations where extreme cheapness is of greater importance than refinement.

In Fig. 40 is shown a tube of copper containing a porous plug 466 of felt, steel wool or similar porous material surrounded by a clamp 467, the screw element 468 of which presses inward against the tube to adjustably compress the latter as at 469 and with it the seepage mass contained therein. The pipe preferably is indented as at 469 to firmly anchor the seepage mass 466 therein in assembly, to retain it against moving lengthwise of the pipe.

The embodiment of Fig. 41 comprises a copper tube 530 containing a wick 531 of felt or equivalent highly compacted porous material, the tube being bent into a V substantially centrally of the wick, the fold 532 formed in the tube by the relatively sharp bend at the inner side effecting a compression of the adjacent portion of the felt to correspondingly restrict the flow. The sharpness of the bend may be readily adjusted to increase or decrease the compression and to correspondingly regulate the flow.

Figure 42:
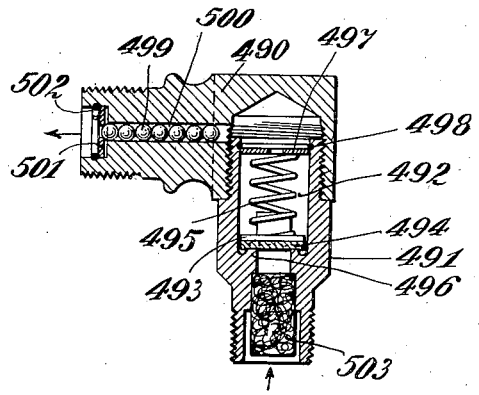

The embodiment of seepage fitting shown in Fig. 42 includes a base or support 490 for application to the bearing or bolt, the cartridge element 491 to which the line (not shown) is attached being threaded into a socket in the base or support. Unlike the embodiment of Fig. 3, the valve is here mounted in the cartridge element and the seepage resistance in the support element. The cartridge element, accordingly, has a bore 49: sufficiently large for mounting the disk valve 493 which is of the construction heretofore described, including a seating portion 494 of one of the preferred materials set forth in the description of Fig. 3, a spring 495 forcing said valve against its seat 496 and reacting against the plate 497 held in place within the cartridge by a split ring 498.

In the present embodiment, the seepage resistance comprises a plurality of small spheres 499 which may be bird-shot balls fitting closely within a corresponding longitudinal bore 500 in the support element and retained in place by a disk 501 at the bearing end of the support, said disk, in turn, retained in place by a split ring 502. The filter plug 503 shown in other embodiments is mounted in the intake end of the fitting.

In operation, the oil under pressure after passing the valve 493 which opens under sufficient oil pressure, is forced successively past the closely fitting diameters of the spheres 499 in succession, so that the oil emerges from the fitting slowly drop by drop. It will be understood that the spheres or balls to effect a resistance to flow equivalent to that of the wire rod plug in the embodiment of Fig. 3 should fit more snugly in the bore than does said wire, since the restrictions effectively retarding the flow in the case of the spheres are located at diameters of the successive balls only, and not continuously throughout the length of the bore.

In Fig. 43 is shown a form of seepage fitting in which the seepage resistance is a part of the valve structure. The support fitting element corresponding to 490 in Fig. 42 is not shown here and would ordinarily be supplied in use, but may be omitted, in which case, the cartridge 504 is directly threaded into the bearing or bolt. In this embodiment, the valve includes a cylindrical metallic tube 505 having an integral countersunk closed end 506 against the outer face of which fits the flexible seating portion 507, the rim 508 of the end 506 extending, when the valve is seated, into a trough 509 in the fitting about the valve seat 510. The valve closing spring 511, as shown, extends into the tube against the end 506. Preferably the outer diameter of the tube 505 is in the neighborhood of but .001 inch smaller than the bore 512 of the fitting, so that, in operation, the pressure in the lubricant is absorbed in passing through the small cylindrical crevice between the tube and the bore. In this embodiment, it will be seen that the lubricant forced between the fitting bore 512 and the valve tube 505 therein through the intermediate seepage crevice, tends by frictional resistance to draw said valve along in the direction of flow, and thus aids to overcome the resistance of the valve seating spring 511, as distinguished from constructions, for instance, of the type shown in Fig. 42 in which the frictional resistance of the spheres to flow, has no effect in maintaining the valve from its seat.

In the embodiment of Fig. 43, therefore, a stronger valve seating spring may be used for a given pump pressure, since the lubricant pressure absorbed in the seepage resistance in this case, becomes effective in raising and maintaining the valve raised from its seat while pressure is applied. The valve 507 will, therefore, be raised under pressure for a substantial distance from its seat, so that the resistance to flow in the fitting is substantially entirely in the minute crevice between the fitting bore and the relief valve tube therein.

Figure 44:
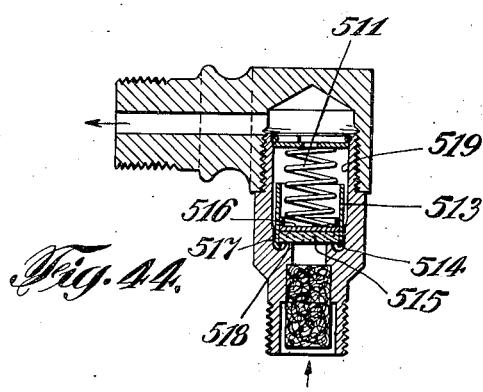

Fig. 44 is an embodiment structurally generally similar to Fig. 43. In this embodiment, the lower end of the cylindrical tube 513 is swaged as at 514 over the periphery of the lower surface of the valve seating portion 515 and the latter is maintained tightly jammed in place within the tube 513 by a flanged friction plate 516 therein.

In this embodiment, the length of the fitting bore 517 adjacent the valve seat 518 is about .001 inch larger in diameter than tube 513 affording a corresponding minute annular crevise about the valve. At a distance of a small fraction of an inch from said valve seat, the fitting bore is widened somewhat as shown at 519 to afford a diameter, preferably about .002 inch larger than that of the valve tube 513, for a purpose which will appear in the operation now to be set forth.

In operation, with the usual grade of oil, when the weather is not cold, the application of the pump discharge pressure will effect opening of the valve 515 to an extent sufficient to permit the slow flow of oil through the high resistance seepage crevice near the seat 518 of the fitting. The operation proceeds substantially as in the embodiment of Fig. 43.

In cold weather, when the oil becomes so viscous that it cannot flow through the minute crevice near the seating end of the fitting, the pressure transmitted through the lubricant becomes effective to bodily move the valve 515 from its seat into the enlarged bore portion 519 of the fitting. The effective crevise being thus materially enlarged in cross-sectional area, the viscous oil can flow therethrough on its way to the bearings. It is particularly to be noted that the enlargement of the bore is merely sufficient to permit slow flow of the more viscous oil without pressure relief. Thus, the seepage fitting described, responds automatically to high pressure delivered through highly viscous oil to decrease the resistance to flow sufficiently to permit flow of the viscous lubricant without relief of pressure and after completion of the discharge, the spring 511 returns the valve to its seat 518.

In Fig. 45 is shown another embodiment of seepage fitting embodying a cartridge fitting element 521 generally similar to that shown in Figs. 42 and 43, except that instead of a disk or cylinder valve, I employ a spherical or ball valve 520 performing the combined function of valve and seepage resistance. The ball 520 is urged against its seat by a spring 522 and is located in a cylindrical bore 523 in the fitting of diameter so little larger than that of the ball that upon the application of pressure to the lubricant and unseating the valve, the crevice for oil flow between the bore and the ball is so minute that the pressure is not relieved and the oil is forced past the ball in the desired slow drop by drop movement.

It will be noted, more particularly in the embodiments of Figs. 43, 44 and 45 that the closure valve and the restricting element fitting the cartridge bore to form the seepage resistance are either one and the same element or are connected to form a unitary structure. As an operational consequence, the lubricant in passing through the minute restriction, as already suggested in the description of Fig. 43 above, tends to draw or drag the restricting member along with it, thereby aiding in maintaining the connected valve open against the resistance of the spring, which tends to reseat it. Since in this embodiment the seepage resistance in operation, assists in maintaining the valve open, it is feasible with a given pump discharge pressure, to use a stronger valve seating spring than in embodiments in which the seepage resistance does not coact in operation to hold the valve from its seat.

It is, of course, understood that any of the various seepage constructions described may be used on any lubricating line or the installation may be equipped at various parts with seepage fittings of different design. It will also be understood that the various distinctive parts of various seepage fittings may in many cases be interchangeably used in other forms of fittings.

The subject matter of the present application has been continued in Patent No. 1,632,771 which is directed to a system of the drip plug type including drip plugs or proportioning resistance units of the general type of original Fig. 3 of the present application; in Patent No. 1,632,772 which is directed to drip plugs or resistance units of the general type of original Fig. 3; in Patents Nos. 1,632,773 to 1,632,775 inclusive, which are directed to a manually actuated pump of the type of original Fig. 17; in Patent No. 1,732,212 which is a division of the present application and is directed to a continuous system having a central source of pressure as shown in original Fig. 18 and flow proportioning outlets as shown in original Figs. 3, 29 and 35 of the present application preferably with loose or suction seated valves of the type shown in Figs. 29 and 35; in Patent No. 1,732,828 which is a division of the present application and which is directed to a two-part drip plug or proportioning unit of the type shown in original Figs. 3, 27 and 42 of the present application; in Patent No. 1,734,026 which is a division of the present application and is directed to a drip plug or restriction unit of the type of original Fig. 27 of the present application; in Patent No. 1,734,027 which is a division of the present application and which is directed to drip plug or proportioning units having loose or suction seated valves of the type shown in original Figs. 29 and 35 of the present application; in Patent No. 1,746,139 which is a division of the present application and which is directed to a completely automatic lubricating system having a central source of pressure of the type shown in original Figs. 17, 19 and 20 of the present application; and with drip plug or proportioning outlets of the type shown in original Figs. 3, 27, 29 and 35; and in Patents Nos. 1,845,826 and 1,845,827 which are particularly directed to conduit arrangements of the type shown in original Figs. 1, 8 to 12 and 21 of the present application.

The present application is also continued in divisional applications Serial No. 330,720, filed January 7, 1929, now Patent No. 1,905,335 which is particularly directed to the proportioning outlets of original Figs. 40 and 41; Serial No. 380,156, filed July 22, 1929, which is directed to the proportioning outlet of original Fig. 42; Serial No. 395,285, filed September 26, 1929, which is directed to the proportioning outlet of original Fig. 3; Serial No. 398,158, filed October 8, 1929, which is directed to the proportioning outlet of original Fig. 29.

The present application is particularly directed to lubricating systems and to chassis lubricating systems specifically. The central lubricating system shown in original Figs. 1, 2, 2a, 4 to 16 inclusive 21 and 22 is of broad application to the lubrication of machinery in general, including automobile chassis, and central systems of this type and character may be supplied with lubricant pressure from any convenient source, of which the sources shown in original Figs. 17 to 20 are merely illustrative examples, and such systems may be utilized to feed any desired type of outlet or outlets which may be of the type illustratively shown in original Figs. 3 and 23 to 45, or which may be of other construction and operating characteristics. With the understanding that the broad system claims are not so limited, certain of the claims will be specifically limited to utilizing the manual and/or automatic pump arrangement of original Figs. 17, 19 and 20 and to utilizing adjustable outlets of the type shown in original Figs. 24, 25, 25a, 26, 33, 34, 38 and 39.

I claim:—

1. In a lubricating installation for a vehicle, in combination, a frame, a source of lubricant thereon, an axle, a bearing carried thereby, a spring interposed between said frame and said axle, an oil-tight pipe line connecting said source of lubricant to said bearing, a supporting runner for said conduit connected at one end adjacent said axle, a spring connecting said runner to said frame at the other end, said conduit having a helically wound portion adjacent said spring to form a bridging connection between said frame and said runner.

2. In a lubricating installation for a vehicle having a frame provided with a cross-bar, a rear axle and spring means interposed between said frame and said axle, a liquid-tight pipe line for feeding oil from said frame to a bearing upon said rear axle including a portion extending longitudinally of said vehicle from said cross-bar to said rear axle, a supporting runner for said pipe portion spring supported at its opposite ends upon said rear axle and said cross-bar, said pipe line being helically formed at the bridging connections from said cross bar to said runner and from the latter to said rear axle.

3. The combination set forth in claim 2 in which the runner is supported at one end by a coil spring and in which the pipe line is helically curved about said coil spring as a support.

4. A lubricating installation for a vehicle of the type having a frame, an axle, a spring interposed between said parts, said installation comprising an oil-tight lubricant carrying pipe having a central elongated straight portion extending from said frame to said axle, said pipe being helically formed adjacent both the ends of said portion to confine yield to these points, thereby avoiding overstrain of the conduit in operation of the vehicle.

5. In a vehicle, in combination, a front axle, a spring thereon, a frame upon said spring, bearings on said front axle, a source of lubricant upon said frame, a runner secured at one end to said axle, and a spring securing the other end of said runner to said frame, a pipe line for conveying lubricant from said frame to said bearing, said pipe line extending along said runner and being secured thereto and having an integral loop adjacent the end of said runner and a second loop at a point somewhat above said end and having a third loop adjacent said axle to permit yield thereof in operation of the vehicle.

6. In a chassis lubricating installation, means for supplying lubricant to a bearing associated with an axle, said means comprising a runner secured to a spring at one end and a spring supporting the other end of said runner from the frame, a conduit having a pipe section upon the frame, a pipe section upon said runner extending lengthwise thereof, a flexible conduit bridging connection between said pipe sections, and a second flexible conduit connection from the pipe section on the runner to the bearing.

7. In a lubricating installation for a vehicle having a frame, a supporting structure therefor including springs, a conduit for conveying lubricant from said frame to bearings on said supporting structure, said conduit comprising a small bore, low inertia metal pipe having a helical conformation at the ends of the portion bridging from a point of support on the frame to a point of support on the supporting structure to form flexible hinging connections at the ends of said portion.

8. In a lubricating installation, in combination, a plurality of distributed bearings, small bore oil-tight piping having branches to the various bearings, high-resistance obstructions in said branches preventing flow when less than a predetermined pressure is applied, means accessible from the exterior of said obstructions for varying the resisting effects thereof to supply to each bearing any desired proportion of a charge of lubricant, said means sealing and protecting said obstructions, and means for applying sustained pressure upon the oil in said conduits to force the same slowly past said obstructions.

9. A lubricating installation for a vehicle having a frame, a supporting structure therefor including springs, bearings on said frame, bearings on said supporting structure, a single cylinder pump upon said frame, piping connecting said pump with said various bearings, said piping including portions of greater flexibility for bridging from the frame to the relatively movable supporting structure to supply the bearings on the latter, high resistance obstructions in said piping in the vicinity of said bearings to permit slow passage of lubricant therethrough while the pump applies a sustained pressure to the lubricant in the line, said obstructions being adjustable in resistance for controlling the rate of lubricant feed to each of the bearings.

10. In a lubricating installation, in combination, a plurality of distributed bearings, a single pressure pump, pipe line means communicating therewith and extending to said bearings, adjustable porous plug seepage resistances in the path of flow of lubricant thereto and in the vicinity of the various bearings, said resistances serving to absorb pressure in the lubricant propelled by said pump, and filter means adjacent the outlet of the pump and in the path of flow of the liquid therefrom and of effective area many times as great as that of the combined cross-sectional area of the seepage resistances to remove any impurities in the lubricant in its path of flow through and to the lines, whereby the seepage resistances will not clog.

11. In a lubricating installation, in combination, a plurality of distributed bearings, a single pressure pump, pipe line means communicating therewith and extending to said bearings, adjustable porous plug obstructing members across said pipe line in the vicinity of said bearings, affording an outlet for lubricant highly restricted at all times, each said obstruction also including a closure to prevent escape of oil when the pump is not operated and filter means to remove any impurities in the lubricant in its path of flow to said obstructions, whereby the latter will not become clogged in operation.

12. The combination set forth in claim 11 in which the filter means is located adjacent the pump to remove impurities from the oil to all of the bearings.

13. The combination set forth in claim 11 in which an individual filter element is located in advance of each obstructing member.

14. The method of lubrication which consists in forcing a charge of lubricant through a filter to a bearing and interposing a high resistance pressure absorbing adjustable porous plug obstruction in the vicinity of said bearing, whereby the lubricant will be forced slowly through said filter and will emerge slowly into said bearing.

15. In a lubricating installation, in combination, a plurality of distributed bearings, a single pressure pump, pipe lines communicating therewith and extending to said bearings, adjustable porous plug seepage obstructions at the outlet ends of said pipes, a filter of surface area much larger than the combined cross-sections of the seepage obstructions and adjacent the exit port of the pump, through which the pump forces its discharge, and strainer, means in advance of the seepage obstructions to intercept impurities such as scale collected in the line of flow.

16. In a lubricating installation for a mechanism having a bearing to be lubricated, said installation being of the type including a central pump, a central reservoir supplying lubricant to said pump, and conduit means leading from said pump with an outlet to said bearing; the combination therewith of a flow controlling means between said outlet and said bearing, comprising an elbow fitting having an intake port in the end of one arm thereof and a delivery port in the other arm for application to a bearing to be lubricated in lieu of an oil cup, a spring-seated valve located in one of said arms and closing the passage therethrough, and adjustable means filling substantially the entire cross-section of the bore of the same arm to afford a minute high resistance passage in series with said valve for flow of lubricant.

17. A central lubricating system comprising a source of lubricant, a manually charged source of pressure, distributing piping supplied therefrom and having highly restricted flow controlling exits to the bearings, and manually adjustable means associated with said source of pressure for varying the discharge pressure thereof to reduce the retardation of flow due to increased viscosity of the lubricating oil in the cold.

18. In a lubricating installation, in combination, a lubricant pump, conduit means for connecting said pump to a plurality of bearings, means for effecting manual charging of said pump, spring means for discharging said pump, and means adapted to be set at will for varying the discharge pressure to compensate for increased viscosity of the lubricating oil.

19. In a lubricating installation for a mechanism having a bearing to be lubricated, said installation being of the type including a central pump, a central reservoir supplying lubricant to said pump, and conduit means leading from said pump with an outlet to said bearing; the combination therewith of a flow controlling means between said outlet and said bearing, comprising a seepage cartridge having an entry port, obstruction, means operable from the exterior for varying the resistance of the obstruction therein to adjust the flow therethrough, said means sealing and protecting the obstructions, said cartridge having an exit port for communication with a bearing.

20. In a lubricating installation for a mechanism having a bearing to be lubricated, said installation being of the type including a central pump, a central reservoir supplying lubricant to said pump, and conduit means leading from said pump with an outlet to said bearing; the combination therewith of a flow controlling means between said outlet and said bearing, comprising an elbow fitting having an intake port in the end of one arm thereof, a delivery port in the arm at right angles thereto, a pressure-absorbing obstruction in one of said arms, and means operable from the exterior of the fitting to vary the resistance of the obstruction to the flow therethrough.

21. In a lubricating installation for a mechanism having a bearing to be lubricated, said installation being of the type including a central pump, a central reservoir supplying lubricant to said pump, and conduit means leading from said pump with an outlet to said bearing, the combination therewith of a flow controlling means between said outlet and said bearing, comprising a pipe fitting including a nipple member for connection to a bearing and a tubular member at right angles thereto, means at one end of said tubular member for connection of a lubricant supply pipe thereto, flow resistance means in said tubular member, and an adjustment plug in the other end of said tubular member for said resistance means to control the flow therethrough.

22. In a lubricating installation for a mechanism having a bearing to be lubricated, said installation being of the type including a central pump, a central reservoir supplying lubricant to said pump, and conduit means leading from said pump with an outlet to said bearing; the combination therewith of a flow controlling means between said outlet and said bearing, comprising a casing member, a flow resistance fitted thereinto, and an adjustment member operable from the exterior of said fitting for varying the obstructing effect of said resistance to adjust the rate of flow therethrough.

23. In a lubricating installation for a mechanism having a bearing to be lubricated, said installation being of the type including a central pump, a central reservoir supplying lubricant to said pump, and conduit means leading from said pump with an outlet to said bearing; the combination therewith of a flow controlling means between said outlet and said bearing, comprising a nipple fitting to be threaded into a bearing in lieu of an oil cup, a cartridge extending transversely into said nipple fitting, a seepage mass packed into said cartridge and a pressure plug member threaded into said fitting for adjusting the compression of said seepage mass to vary the rate of flow therethrough.

24. In a lubricating installation for a mechanism having a bearing to be lubricated, said installation being of the type including a central pump, a central reservoir supplying lubricant to said pump, and conduit means leading from said pump with an outlet to said bearing; the combination therewith of a flow controlling means between said outlet and said bearing, comprising an angular pipe joint, a valve therein, flow resisting material tightly packed into one arm of said fitting, a threaded closure plug adjustable from an end of said arm to vary the compression of said resistance material against a ledge in said arm in order to adjust the rate of flow to said arm, the other arm of said pipe joint serving as an exit port.

25. In a lubricating installation for a mechanism having a bearing to be lubricated, said installation being of the type including a central pump, a central reservoir supplying lubricant to said pump, and conduit means leading from said pump with an outlet to said bearing; the combination therewith of a flow controlling means between said outlet and said bearing, comprising a pipe joint, an adjustable restriction, a relief valve and a seat therefor, and said restriction affording a highly restricted high-resistance pressure absorbing passage upon application of high fluid pressure thereto, whereby the oil will emerge from said fitting with little or no pressure, and whereby upon relief of the pressure at the intake end of the fitting said valve will close tightly to prevent dripping of oil from the line or entry of air thereto.

26. In a remote-control slow-feed lubricating installation, in combination, a fluid-tight small-bore conduit section extending from the point of control to the vicinity of the bearing, an obstruction for the bearing end of said conduit, a normally empty relatively movable conduit section beyond said obstruction to said bearing, and means for applying sustained pressure from time to time to lubricant in said fluid-tight conduit at the control end thereof for slow seepage thereof past said obstruction through said normally empty conduit to said bearing.

27. A lubricating installation for a machine of the type having a bearing upon a part thereof movable with respect to another part, means for lubricating said bearing from said latter part, said means comprising a conduit having a displaceable part to permit of the relative movement of the machine parts without strain upon the conduit, said conduit being oil-tight between said displaceable part and the source of lubricant, means for applying pressure to the lubricant in said conduit to feed it to said bearing and a high resistance obstruction in said conduit to absorb the pressure upon the oil for seepage therebeyond through the displaceable part to the bearing.

28. In a lubricating installation for a vehicle body, in combination, a frame, axles, spring means interposed between said frame and said axles, bearings on said axles, oil-tight piping along said frame, closure means for said piping confining the oil therein below a predetermined pressure and absorbing excess pressure upon the oil for slow flow thereof past said closure means, and conduits connecting said piping to said bearings, said conduits having yielding parts to permit the movement of the axles relative to the frame in operation of the vehicle without strain upon or rupture of said conduits.

29. In a chassis lubricating installation, in combination, means for lubricating from a source on the frame, a bearing upon an axle, said means comprising a pressure-tight pipe extending from said source along said frame, a flexible conduit communicating therewith and with said bearings, an obstruction in the line of said pipe, adjacent said flexible conduit to permit only slow flow of oil therethrough under pressure, whereby when sustained pressure is applied, the oil in said conduit will seep past said obstruction and be fed through said flexible conduit to said bearing, thereby maintaining the flexible conduit normally empty and at all times free from pressure.

30. In a chassis lubricating installation, in combination, a single-cylinder oil pump upon the frame, small-bore pressure-tight conduits from said pump along the sides of said frame, bearings on said frame supplied from said piping, flexible branches from said piping to supply the bearings on the axles, seepage resistances in the line of oil flow adjacent the bearings on the frame, and a seepage resistance adjacent the entry end of each of said flexible branches.

31. In a lubricating installation, in combination, a single cylinder pump, a header connected thereto, means connected to said header and communicating with the bearings, a seepage resistance in the line in advance of each bearing and manually operable stop cocks for interrupting the flow from the header to any one of the mains, whereby upon rupture in any part of the line the pressure may be removed therefrom and the operation of the rest of the installation will remain unimpaired.

32. In a lubricating installation of the seepage type for supplying lubricant from a source to a bearing movable relative thereto, in combination, a pump, a conduit connecting said pump to said bearing, said conduit having a non-flexible oil-tight section and a more flexible portion connecting the latter to the bearing, and means in said conduit adjacent said more flexible portion responding to the drop in counter-pressure resulting from rupture in the flexible line to close the conduit against flow to said flexible line while the high pressure endures, whereby expulsion of lubricant otherwise resulting from a rupture in the flexible portion of the conduit is avoided.

33. In a lubricating installation for a motor vehicle including a frame, an axle therebelow, a spring connecting said frame and said axle and a bearing carried by said axle; the combination therewith of a lubricant pump carried upon said frame, a pressure tight small-bore pipe connecting said pump to said bearing, said pipe being normally filled with oil and including a portion of greater flexibility for bridging between said relatively movable vehicle parts, an obstruction near the bearing for preventing the egress of oil from the normally full line, said obstruction having a portion offering high resistance to lubricant flow, and a rapid flow valve in said conduit in advance of said more flexible portion, said valve having a small passage to allow the normal slow feed of oil when the installation is operating and having means responding to the reduction in counterpressure resulting from a break in the line at the flexible portion to close said valve for preventing further flow of oil therethrough while the high pressure endures.

34. The combination set forth in claim 33 in which a check valve is disposed in advance of said rapid flow valve to prevent loss of lubricant from the broken line after pressure in the pump has subsided.

35. In a lubricating installation for a mechanism having a bearing to be lubricated, said installation being of the type including a central pump, a central reservoir supplying lubricant to said pump, and conduit means leading from said pump with an outlet to said bearing; the combination therewith of a flow controlling means between said outlet and said bearing, comprising a pipe fitting, a plug of compressible porous material therein, said plug being highly restricted and compressed near the delivery end thereof to absorb a considerable portion of the pressure of the line, said plug having a portion under lesser compression in advance of said first portion to afford relatively free admission of the lubricant both in an axial and in a radial direction for filtering the lubricant prior to its passage to the highly restricted portion.

36. In a lubricating installation for a mechanism having a bearing to be lubricated, said installation being of the type including a central pump, a central reservoir supplying lubricant to said pump, and conduit means leading from said pump with an outlet to said bearing; the combination therewith of a flow controlling means between said outlet and said bearing, comprising a pipe fitting having a delivery nipple, said fitting having means at one end for connection of a feed pipe, filter means therein, a high resistance plug connected in said fitting between said filter member and said nipple, and a closure plug for the end of said fitting opposite said feed end exerting pressure upon said resistance material.

37. In a lubricating installation for a mechanism having a bearing to be lubricated, said installation being of the type including a central pump, a central reservoir suplying lubricant to said pump, and conduit means leading from said pump with an outlet to said bearing; the combination therewith of a flow controlling means between said outlet and said bearing, comprising a pipe fitting having a cartridge with means for connection of a feed pipe at one end and a delivery nipple extending at an angle thereto, a seepage plug in said cartridge across the flow of liquid to said nipple, a pressure plug accesible from an end of said cartridge opposite said intake end for adjusting the compression of said plug, and a filter member of surface area much larger than the cross-section of said seepage plug and interposed in the path of flow of the liquid to said plug.

38. In a lubricating installation for a mechanism having a bearing to be lubricated, said installation being of the type including a central pump, a central reservoir supplying lubricant to said pump, and conduit means leading from said pump with an outlet to said bearing; the combination therewith of a flow controlling means between said outlet and said bearing, comprising a fluid pressure-absorbing member, a normally closed by-pass about said member, and means accessible from the exterior of said fitting and manually operable to open said by-pass.

39. In a lubricating installation for a mechanism having a bearing to be lubricated, said installation being of the type including a central pump, a central reservoir supplying lubricant to said pump, and conduit means leading from said pump with an outlet to said bearing; the combination therewith of a flow controlling means between said outlet and said bearing, comprising a pipe fitting, a high-resistance fluid pressure absorbing element therein, a manually controlled valve in said fitting and a spring normally urging said valve to close a by-pass about said pressure-absorbing element, whereby pressing said valve from the exterior will open said by-pass to allow free flow of said lubricant about said pressure-absorbing plug.

40. In a lubricating insulation, in combination, a conduit for lubricant, means for placing the lubricant under pressure in said conduit, a plurality of bearings connected to said conduit, seepage resistance interposed between said conduit and said bearings for slow passage of the lubricant therethrough to said bearings, each said seepage resistance having a manually operated means associated therewith for forming a by-pass for the lubricant about the seepage resistance, whereby lubricant may be supplied at will under pressure to any one or more selected bearings.

41. In a lubricating installation for a mechanism having a bearing to be lubricated, said installation being of the type including a central pump, a central reservoir supplying lubricant to said pump, and conduit means leading from said pump with an outlet to said bearing; the combination therewith of a flow controlling means between said outlet and said bearing, comprising a pipe element, a seepage resistance therein, means exerting pressure against said seepage resistance at one end thereof through which the rate of flow of lubricant through said seepage resistance is regulated, and a union sleeve connecting said means and said pipe element to adjust the distance between said elements for regulating the pressure, and a spring interposed between said means and said pipe to maintain the parts distended, all of said elements being coaxial.

42. In a centralized installation for a machine, in combination, a centralized source of pressure for propelling the lubricant to the bearings, pressure absorbing means in advance of the bearings for slow feed of the lubricant thereto, and means to automatically effect a connection between an element of the machine and said source of pressure to recharge the latter by energy derived from said machine when the energy in said source of pressure has been consumed to a predetermined extent, means for automatically disconnecting said machine member from said source of pressure after the latter is charged, and adjustable means to regulate the pressure applied to said pressure absorbing means and the pressure absorbed therein.

43. In a centralized installation for a machine, in combination, a lubricant pressure pump, lubricant conduit means connected thereto for supplying the bearings therefrom, pressure absorbing means across the path of flow of lubricant to the bearings for slow flow thereof, spring means to exert the pressure upon the pump for propelling the lubricant, means to automatically connect said pump to said machine when the pump is discharged to a predetermined extent thereby to recharge said pump and re-energize said spring, and adjustable means to regulate the pressure applied to said pressure absorbing means and the pressure absorbed therein.

44. In a centralized lubricating installation for a motor vehicle, in combination, an engine having a conduit for the combustible mixture including an intake manifold, engine cylinders and an exhaust, a lubricant station, conduits from said station to the bearings of the vehicle, means for exerting pressure upon lubricant in said station, means across the flow of lubricant to the bearings for absorbing pressure for slow feed of the lubricant thereto, means connecting said source to a portion of said combustible mixture conduit to produce the pressure for propelling the lubricant, and adjustable means to regulate the pressure applied to said pressure absorbing means and the pressure absorbed therein.

45. In a centralized lubricating installation for a motor vehicle, in combination, a lubricant pump, conduit means connected to said pump for conveying lubricant to the various bearings, pressure absorbing means across said conduits in advance of said bearings for slow feed of lubricant thereto, means connecting the said pump to a portion of said combustible mixture conduit for applying to the pump the energy for propelling the lubricant, and adjustable means to regulate the pressure applied to said pressure absorbing means and the pressure absorbed therein.

46. The combination set forth in claim 45 in which the pump is automatically connected to the combustible mixture conduit of the engine when the pump nears its discharged condition to supply the energy for recharging the pump against the resistance of the actuating spring for the pump and in which said means is automatically disconnected when the pump is recharged.

47. In a central lubricating installation for an automobile provided with a source of fluid pressure different than atmospheric, and with a plurality of spaced bearings to be lubricated, said installation being provided with a branched piping system leading to said bearings with adjustable flow proportioning outlets connected to said bearings, a central adjustable source of lubricant supply and pressure comprising a cylinder, a piston therein, a spring to urge said piston to discharged position, an operating head for said piston, means for changing the pressure on one side of said operating head to effect charging of said cylinder against the resistance of said spring, a two-way valve for operatively connecting said means in one position and in the other position for communicating with the external atmosphere to equalize the pressures on opposite sides of the operating head for permitting the spring to discharge the cylinder.

48. In a central lubricating installation for an automobile provided with a source of fluid pressure different than atmospheric, and with a plurality of spaced bearings to be lubricated, said installation being provided with a branched piping system leading to said bearings with adjustable flow proportioning outlets connected to said bearings, a central adjustable source of lubricant supply and pressure comprising a lubricant pump normally urged to discharged position, an operating head for said pump, piping for connecting one side of said head to a portion of the combustible mixture conduit of the engine, a valve in said piping to effect operative connection for raising the head to charge the pump, said valve when disconnected establishing communication of the piping to the external atmosphere for equalization of the pressure on opposite sides of the head to allow discharge of the pump.

49. In a motor vehicle having a lubricating pump and a chassis having bearings provided with lubricator openings, the combination of lubricators mounted respectively in said openings, each of said lubricators being provided with a bore registering with the opening in the bearing, a supply line for conducting lubricant under pressure from the pump to a series of said lubricators, and adjustable means including an approximately cylindrical plug member forming elongated restriction passage means of capillary size and a threaded arrangement associated with each plug member to vary the restricting effect of said passage means associated with each lubricator for regulating the flow of lubricant through the individual lubricators to their respective bearings.

50. In a motor vehicle having a lubricating pump and a chassis having bearings provided with lubricator openings, the combination of lubricators mounted respectively in said openings, each of said lubricators being provided with a bore registering with the opening in the bearing, a supply line for conducting lubricant under pressure from the pump to a series of said lubricators, adjustable means including an approximately cylindrical plug member forming elongated restriction passage means of capillary size and a threaded arrangement associated with each plug member to vary the restricting effect of said passage means associated with each lubricator for regulating the flow of lubricant through the individual lubricators to their respective bearings, and additional manually operable means for controlling the supply of lubricant to the entire series of lubricators.

51. In a motor vehicle having a lubricating pump and a chassis having bearings provided with lubricator openings, the combination of lubricators mounted respectively in said openings, each of said lubricators being provided with a bore registering with the opening in the bearing, a supply line for conducting lubricant under pressure from the pump to a series of said lubricators, and adjustable means including a plug of a porous pressure absorbing material with minute capillary passages therethrough and a threaded arrangement for holding said plug in position in said lubricator associated with each lubricator for regulating the flow of lubricant through the individual lubricators to their respective bearings.

52. In a motor vehicle having a lubricating pump and a chassis having bearings provided with lubricator openings, the combination of lubricators mounted respectively in said openings, each of said lubricators being provided with a bore registering with the opening in the bearing, a supply line for conducting lubricant under pressure from the pump to a series of said lubricators, and adjustable means including a plug of a fibrous material with minute capillary passages therethrough and a threaded arrangement for holding said plug in position in said lubricator associated with each lubricator for regulating the flow of lubricant through the individual lubricators to their respective bearings.

53. In a motor vehicle having a lubricating pump and a chassis having bearings provided with lubricator openings, the combination of lubricators mounted respectively in said openings, each of said lubricators being provided with a bore registering with the opening in the bearing, a supply line for conducting lubricant under pressure from the pump to a series of said lubricators, said adjustable means including a plug of organic fibrous material with minute capillary passages therethrough and a threaded arrangement for holding said plug rigidly in position in said lubricator associated with each lubricator for regulating the flow of lubricant through the individual lubricators to their respective bearings.

54. In a motor vehicle having a lubricating pump and a chassis having bearings provided with lubricator openings, the combination of lubricators mounted respectively in said openings, each of said lubricators being provided with a bore registering with the opening in the bearing, a supply line for conducting lubricant under pressure from the pump to a series of said lubricators, and adjustable means including a plug of compacted felt with minute capillary passages therethrough and a threaded arrangement for holding said plug rigidly in position in said lubricator associated with each lubricator for regulating the flow of lubricant through the individual lubricators to their respective bearings.

55. In a motor vehicle having a lubricating pump and a chassis having bearings provided with lubricator openings, the combination of lubricators mounted respectively in said openings, each of said lubricators being provided with a bore registering with the opening in the bearing, a supply line for conducting lubricant under pressure from the pump to a series of said lubricators, adjustable means associated with each lubricator for regulating the flow of lubricant through the individual lubricators to their respective bearings, and valve means similarly associated with each lubricator for maintaining said supply line filled with lubricant during the intervals between pressure application from the pump.

56. In a motor vehicle having a lubricating pump and a chassis having bearings provided with lubricator openings, the combination of lubricators mounted respectively in said openings, each of said lubricators being provided with a bore registering with the opening in the bearing, a supply line for conducting lubricant under pressure from the pump to a series of said lubricators, adjustable means associated with each lubricator for regulating the flow of lubricant through the individual lubricators to their respective bearings, and filter means in said lubricator positioned ahead of said adjustable means to collect any dirt particles and prevent clogging of said adjustable means.

57. In a lubricating system, a bearing, a source of lubricant, a conduit leading from said source to said bearing, and a metering member in said conduit, said member including a disk of a porous flow resisting material and inlet and outlet connections to the disk causing lubricant to flow radially through the disk.

58. In a lubricating system, a bearing, a source of lubricant, a conduit leading from said source to said bearing, and a metering member in said conduit, said member including a disk of a porous flow resisting material and inlet and outlet connections to the disk causing lubricant to flow radially through the disk, said connections including an impermeable backing member and a tube pressing concentrically upon said disk and pressing said disk against said backing member, the interior of the tube forming said inlet connection to feed lubricant to the central part of said disk, said outlet connection receiving lubricant from the peripheral portion of said disk.

59. In a lubricating system, a bearing, a source of lubricant, a conduit leading from said source to said bearing, and a metering member in said conduit, said member including a body of a porous flow restricting material and inlet and outlet connections to the body, said body being elongated with inlet and outlet ends and of a compressible material, means to compress said body, the outlet end of said body being substantially more compressed than the inlet end.

60. In a lubricating system, a bearing, a source of lubricant, a conduit leading from said source to said bearing, and a metering member in said conduit, said member including a body of a porous flow restricting material and inlet and outlet connections to the body, said member including a tube, said body taking the form of an elongated compressible cylinder, and means on each end of said tube to compress said cylinder into said tube.

61. In a lubricating system, a bearing, a source of lubricant, a conduit leading from said source to said bearing, and a metering member in said conduit, said member including a body of a porous flow restricting material and inlet and outlet connections to the body, said body having a maximum cross sectional flow area and a minimum restricting effect at its inlet end and a minimum cross sectional flow area and a maximum restricting effect at its outlet end.

62. In a lubricating system, a bearing, a source of lubricant, a conduit leading from said source to said bearing, and a metering fitting in said conduit with inlet and outlet connections, said fitting including a restriction member limiting the flow to the bearing and a release member to permit lubricant to flow to said bearing without restriction.

63. In a lubricating system, a bearing, a source of lubricant, a conduit leading from said source to said bearing, and a metering fitting in said conduit with inlet and outlet connections, said fitting including a restriction member limiting the flow to the bearing, a by-pass around said restriction member leading from said inlet to said outlet connection, a valve closing said by-pass and means to open said valve.

64. In a central lubricating system for a mechanism having a plurality of spaced bearings, a central pump, a branched piping system leading to said bearings including metering means to apportion the lubricant among and located adjacent said bearings, and means upon said system also located adjacent said bearings to permit an excess unmetered supply of lubricant to pass to said bearings without passing through said metering means.

65. In a central lubricating system for a mechanism having a plurality of bearings, a central pump, a branched piping system conducting lubricant from said pump to said bearings, and a plurality of metering fittings connecting the outlets of said piping system to said bearings, each of said fittings being provided with a high restriction flow metering means and with manually controlled means to by-pass said flow metering means.

JOSEPH BIJUR.